Dec. 6, 1932.

J. E. OSTLINE

MULTIOFFICE TELEPHONE SYSTEM

Re. 18,688

Original Filed April 9, 1923 10 Sheets-Sheet 1

Orig. 1,680,565

Inventor
John E. Ostline
Chas. M. Candy Atty.

Dec. 6, 1932.

J. E. OSTLINE

MULTIOFFICE TELEPHONE SYSTEM

Re. 18,688

Original Filed April 9, 1923 10 Sheets-Sheet 2

Inventor
John E. Ostline
Chas. M. Candy Atty.

Dec. 6, 1932. J. E. OSTLINE Re. 18,688

MULTIOFFICE TELEPHONE SYSTEM

Original Filed April 9, 1923 10 Sheets-Sheet 3

Inventor
John E. Ostline
Chas. M. Candy Atty.

Dec. 6, 1932.

J. E. OSTLINE

MULTIOFFICE TELEPHONE SYSTEM

Re. 18,688

Original Filed April 9, 1923 10 Sheets-Sheet 4

Inventor
John E. Ostline

Chas. N. Candy Atty.

Dec. 6, 1932.

J. E. OSTLINE

MULTIOFFICE TELEPHONE SYSTEM

Re. 18,688

Original Filed April 9, 1923 10 Sheets-Sheet 5

Inventor
John E. Ostline
Chas. M. Candy Atty:

Dec. 6, 1932.

J. E. OSTLINE

MULTIOFFICE TELEPHONE SYSTEM

Re. 18,688

Original Filed April 9, 1923 10 Sheets-Sheet 6

Inventor
John E. Ostline

Chas. M. Cady Atty.

J. E. OSTLINE

Dec. 6, 1932. MULTIOFFICE TELEPHONE SYSTEM Re. 18,688

Original Filed April 9, 1923 10 Sheets-Sheet 7

Inventor
John E. Ostline

Chas. M. Candy Atty.

Dec. 6, 1932. J. E. OSTLINE Re. 18,688

MULTIOFFICE TELEPHONE SYSTEM

Original Filed April 9, 1923 10 Sheets-Sheet 8

Inventor
John E. Ostline
Chas. W. Landy Atty.

Dec. 6, 1932. J. E. OSTLINE Re. 18,688

MULTIOFFICE TELEPHONE SYSTEM

Original Filed April 9, 1923 10 Sheets-Sheet 9

Inventor
John E. Ostline
Chas. M. Candy Atty.

| CODE CHART | | |
|---|---|---|
| DIGITS | CONDITION OF CONTROL TRUNK CONDUCTOR. | GROUND IMPULSES DELIVERED TO PULSING TRUNK CONDUCTOR. |
| 1 | NEUTRAL | 1 |
| 2 | NEUTRAL | 2 |
| 3 | NEUTRAL | 3 |
| 4 | HIGH RES. GRD. | 1 |
| 5 | HIGH RES. GRD. | 2 |
| 6 | HIGH RES. GRD. | 3 |
| 7 | DIRECT GRD. | 1 |
| 8 | DIRECT GRD. | 2 |
| 9 | DIRECT GRD. | 3 |
| 0 | NEUTRAL | NONE |

Inventor
John E. Ostline
Chas. W. Candy Atty.

Reissued Dec. 6, 1932

Re. 18,688

UNITED STATES PATENT OFFICE

JOHN E. OSTLINE, OF BERWYN, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

MULTIOFFICE TELEPHONE SYSTEM

Original No. 1,680,565, dated August 14, 1928, Serial No. 630,726, filed April 9, 1923. Renewed January 5, 1928. Application for reissue filed December 3, 1931. Serial No. 578,837.

The present invention relates in general to multi-office telephone systems, but more particularly to such systems as comprise in one net work offices or exchanges of two different kinds, the offices of one kind being manual offices wherein connections are completed by operators, while the other kind of offices are automatic offices in which connections are completed by means of automatic switches; and the object of the invention is to provide new and improved circuit arrangements for handling inter-office calls from an automatic exchange to a manual exchange.

The various features of novelty will be fully pointed out hereinafter, reference being had to the accompanying drawings.

Figs. 1 to 8, inclusive, are circuit diagrams of sufficient of the apparatus used in a system of this kind to illustrate the preferred form of the invention. The equipment represented by Figs. 1 to 3, inclusive, is located in the automatic exchange, while the equipment represented by Figs. 4 to 8, inclusive, is located in the manual exchange.

Figure 9:
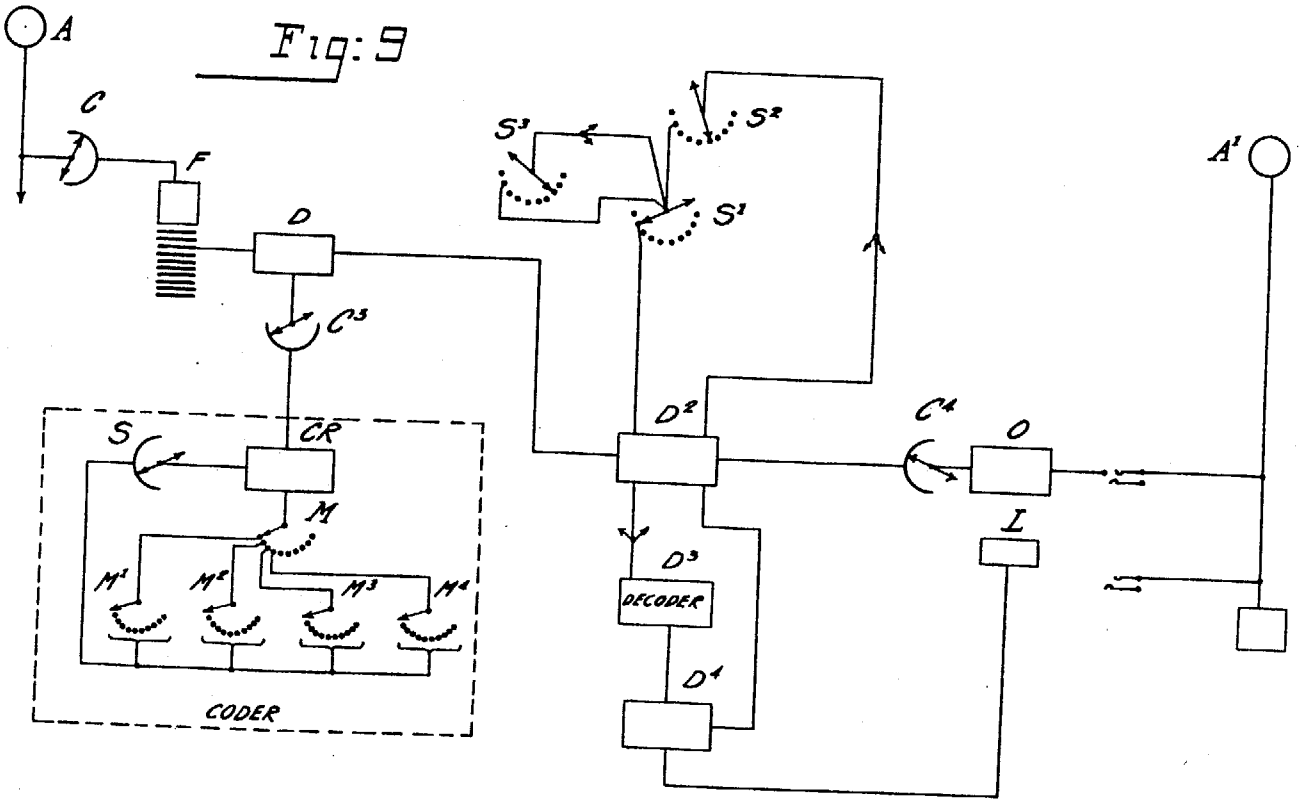
Fig. 9 is a trunking diagram of the system which is shown in detail in Figs. 1 to 8, inclusive.

It will be advisable to first consider the trunking layout, Fig. 9, as an understanding of this will assist in the explanation of the rest of the drawings. It may be stated that the illustration of the trunking is only fragmentary. The substation A is one of a plurality of ordinary automatic substations terminating in an automatic exchange, and is provided with the usual talking, signalling and impulse sending instrumentalities. The conductors from the substation A terminate in the line switch C, which may be briefly described as a rotary line switch whose wipers move in a forward direction only. A plurality of these line switches are given access to a group of trunk lines extending to first selector switches.

One of the trunk lines to which the line switch C has access is shown in the drawings as extending the selector F, which is a vertical and rotary selector of the well known Strowger type. In a multi-office system of the kind herein contemplated, the first selector switches are usually known as office selectors, and the selector F, in common with a plurality of similar selectors, has access to a plurality of groups of trunk lines, each of which groups may be extended to a different office or exchange in the system. Some of these groups of trunk lines may extend to automatic exchanges, while other groups may extend to manual exchanges. A trunk line in one of the latter groups is shown in the drawings, and extends by way of the repeater D to the trunk relay group $D^2$ in a manual office.

When a connection is extended to the repeater D no circuit changes take place at the manual office, but the coder selecting line switch $C^3$, associated with the repeater in question, operates to select an idle coder. As the wiper of the master digit controller M is in first position the dialling of the next digit in the called number will cause the first digit register $M^1$ to advance its wipers a like number of steps, after which the master digit controller M will move to second position. When the next digit of the called number is dialled the second digit register $M^2$ will advance its wipers a like number of steps, after which the switch M will move to third position. When the next digit of the called number is dialled the third digit register $M^3$ will advance its wipers a like number of steps, after which the switch M will move to fourth position. When the next digit of the called number is dialled the fourth digit register $M^4$ will advance its wipers a like number of steps, after which the switch M will move to fifth position.

When the registration is complete a circuit is closed to the trunk relay group $D^2$ at the manual office. The trunk relay group $D^2$ will now remove ground from the test contacts associated therewith in the multiple banks of the markers, and at the same time will place ground upon the starting common leading to the marker distributer $S^2$. It will be assumed that the marker distributer $S^2$ has already preselected the marker $S^1$, which will now advance its wiper into engagement with the test contact associated with the trunk relay group $D^2$. A further result of the operation of the marker $S^1$ is the grounding of the associated test contact in the bank of the marker distributer $S^2$, whereupon the said switch will preselect another marker. A further result of the operation of the marker $S^1$ is the removal of ground from the test contact associated therewith in the bank of the set-up control switch $S^3$, and at the same time ground will be placed upon the starting common leading to the set-up control switch $S^3$.

The set-up control switch $S^3$ advances from one position to the next as the connections are completed, and when its wiper engages the particular bank contact associated with the marker $S^1$, a circuit change will occur in the trunk relay group $D^2$, whereupon trunk relay group $D^2$ will become associated with the decoder $D^3$. The conductors leading to the decoder $D^3$ are multipled through each trunk relay group in the position. At this time a change will occur in the inter-office trunk circuit such that the sending switch S will proceed to deliver a series of code trains to the decoder $D^3$, which correspond to the number set up on the digit registers $M^1$ to $M^4$, inclusive. Certain counting relays in the decoder will respond to these code trains, and when the decoding is complete, the circuit is transferred over a plurality of conductors to the storage relay group $D^4$, whereupon the last four digits of the called number will be displayed upon the call indicator lamps L.

At this time the set-up control switch $S^3$ will advance to the next marker, whereupon the decoder becomes dissociated from the trunk relay group $D^2$ and becomes associated with the trunk relay group selected by the next marker. At this time the trunk relay group $D^2$ causes ground to be removed from the test contacts associated therewith in the banks of the trunk finders, such as the trunk finder $C^4$.

The operator will now take any plug in her position and insert the same into the multiple jack of the line whose number is displayed upon the call indicator lamps L. It will be assumed that the plug associated with the cord circuit O is used, whereupon the trunk finder $C^4$ will seek the ungrounded test contact associated with the trunk relay group $D^2$. When the cord circuit O becomes associated with the relay group $D^2$ the storage relay group $D^4$ and the call indicator lamps L will be released, whereupon the decoder $D^3$ may transfer a new call number to the storage relay group.

Figure 1:
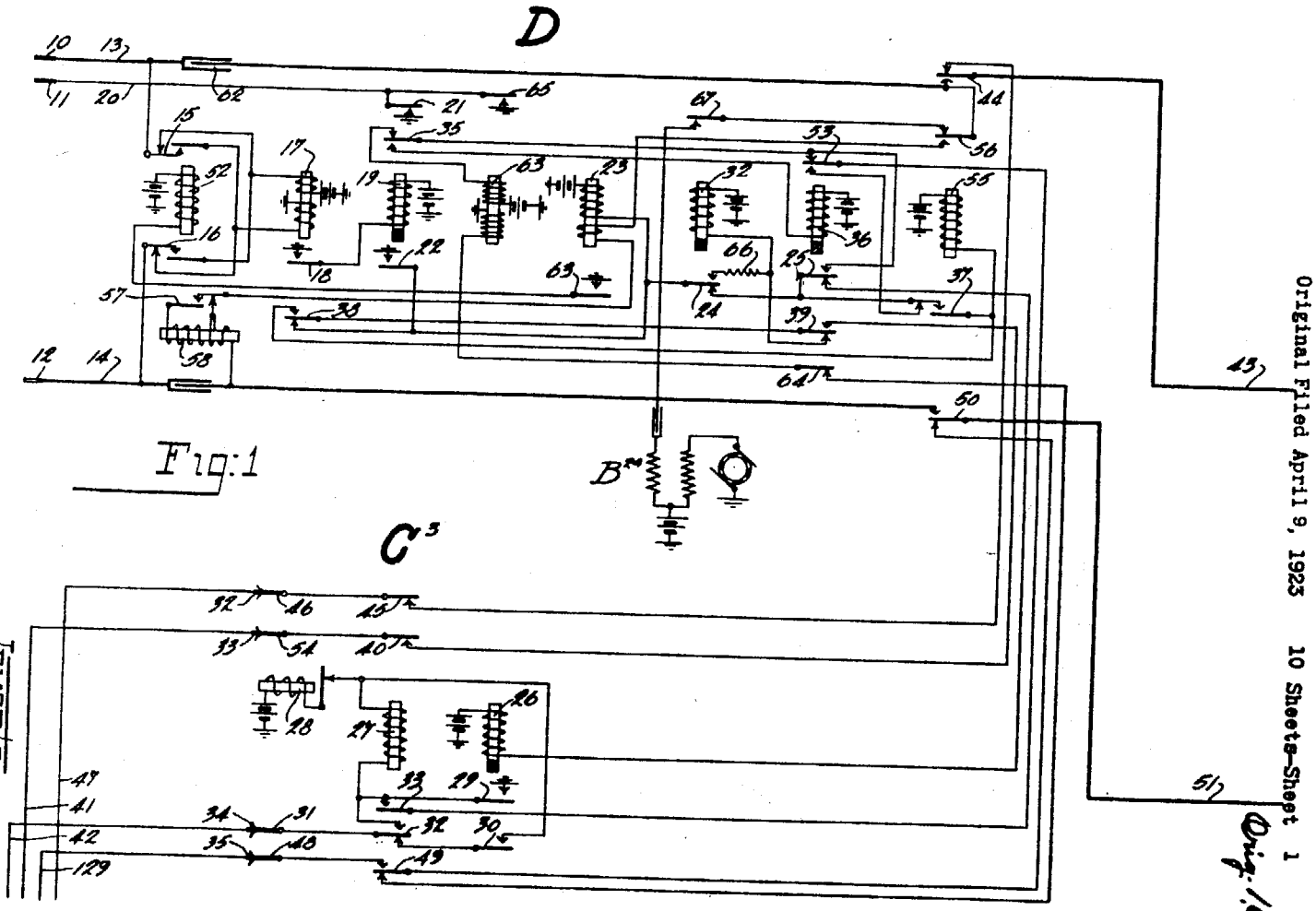
Fig. 1 is a circuit diagram of an automatic to manual repeater D, together with the coder selecting line switch $C^3$.

Proceeding now to the detailed explanation of the circuit drawings and referring first to Fig. 1, the repeater D is an automatic impulse repeater of the general type in common use, and in addition to provisions for repeating operating impulses, it provides a holding circuit for the automatic switches and thus renders it unnecessary to use more than two conductors for the inter-office trunk. The coder selecting line switch $C^3$ may be briefly described as a rotary line switch whose movable terminals or wipers have no normal position, and which have movement in a forward direction only. In further explanation, it may be stated that the wipers of this switch advance upon the deenergization of the stepping magnet rather than upon its energization. As shown in the figure, each repeater D has in association therewith a coder selecting line switch, such as the line switch $C^3$. A plurality of these line switches are given access to a group of trunks, each of which extends to a coder. In practice, a group of coders would be provided equal in number to the maximum number of simultaneous uncompleted connections likely to occur in the group of repeaters served by the aforementioned coders.

Figure 2:
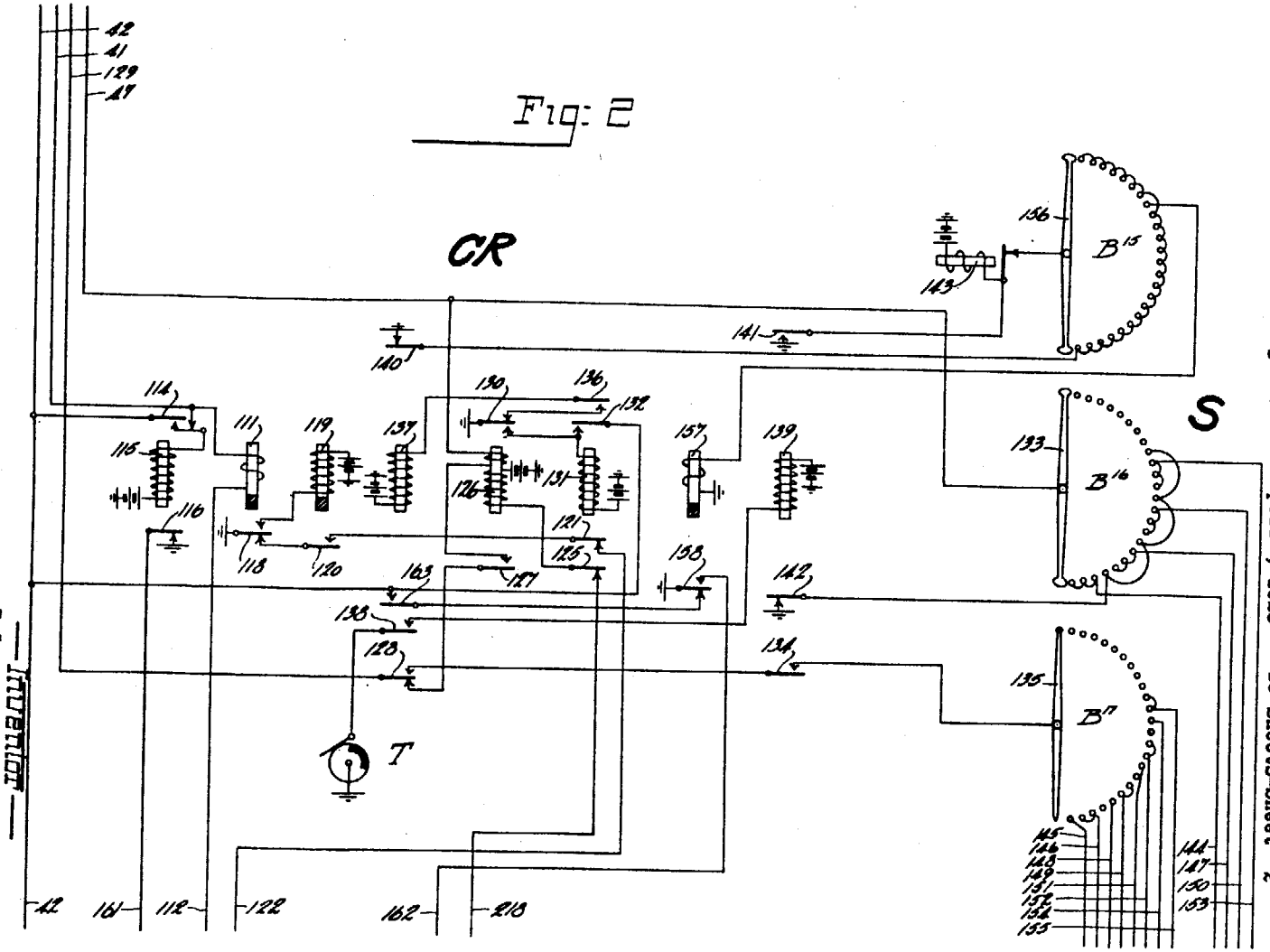
Fig. 2 is a circuit diagram of a portion of a coder, and discloses the coder relay group CR, and the sending switch S.

Referring to Fig. 2 there will be found the coder relay group CR which controls the operation of the registering equipment and of the sending switch S. The sending switch S is a rotary switch similar to the coder selecting line switch $C^3$. It may be stated at this time that the wiper 133 of the switch S is so constructed that it will engage the next contact in its bank before breaking connection with the preceding contact. The interrupter T may be considered as being a constantly moving device capable of impressing ground impulses upon armature 138 at the rate of approximately 10 impulses per second.

Figure 3:
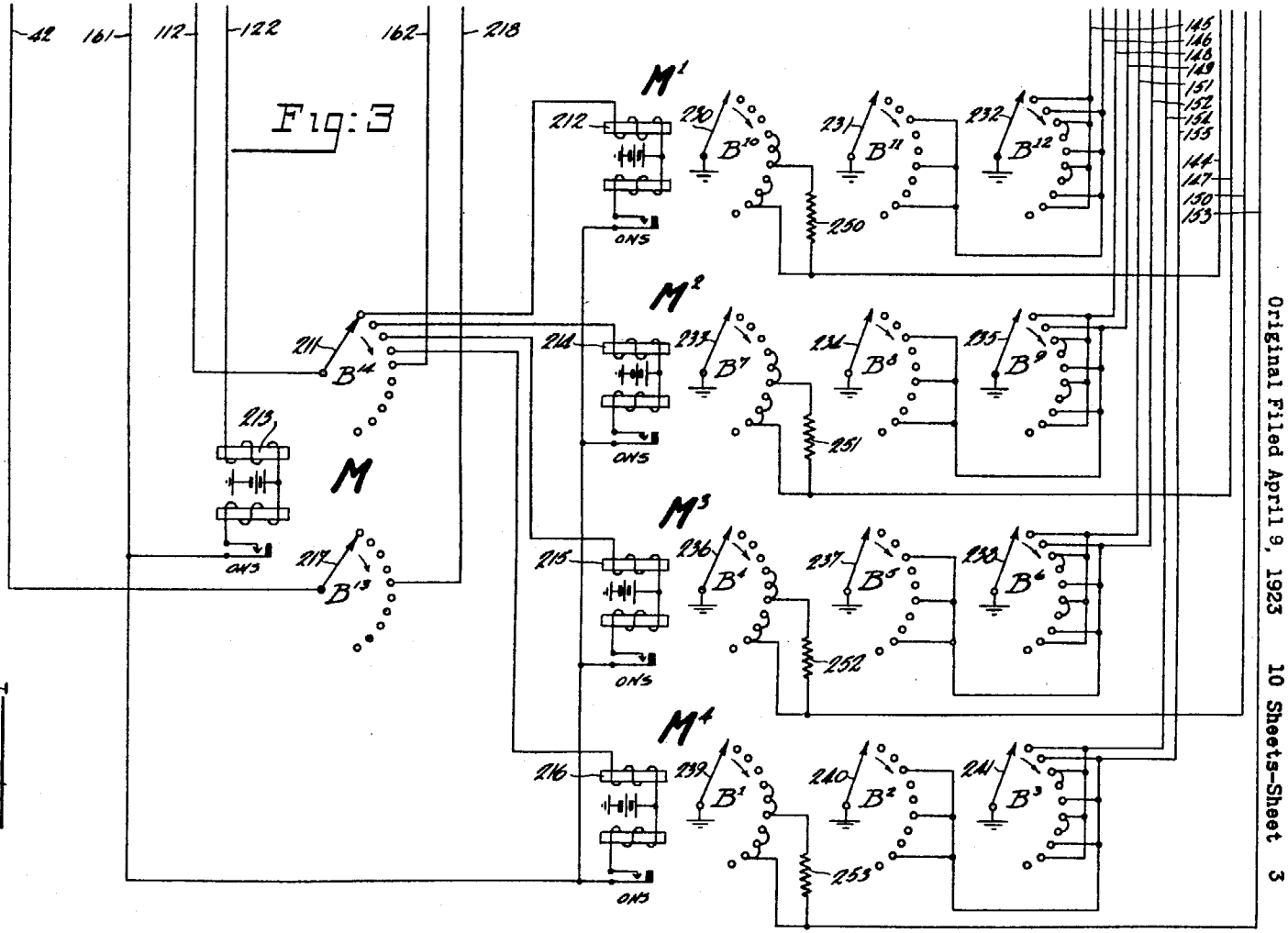
Fig. 3 is a circuit diagram of the remainder of the coder and discloses the master digit controller M, and the first, second, and fourth digit registers $M^1$ to $M^4$, inclusive.

Referring to Fig. 3, the master digit controller M, the first digit register $M^1$, the second digit register $M^2$, the third digit register $M^3$, and the fourth digit register $M^4$ are simple ten point step by step switches, each of which is provided with an operating magnet, a release magnet, and a set of off normal springs which are operated when the switch wipers are advanced out of their normal position. The master digit controller M advances the wipers 211 and 217 over banks $B^{14}$ and $B^{13}$, respectively. The first digit register $M^1$ advances the wipers 230, 231 and 232 over the banks $B^{10}$, $B^{11}$ and $B^{12}$, respectively. The second digit register $M^2$ advances the wipers 233, 234 and 235 over the banks $B^7$, $B^8$ and $B^9$, respectively. The third digit register $M^3$ advances the wipers 236, 237 and 238 over the banks $B^4$, $B^5$ and $B^6$, respectively. The fourth digit register $M^4$ advances the wipers 239, 240 and 241 over the banks $B^1$, $B^2$ and $B^3$, respectively.

Figure 4:
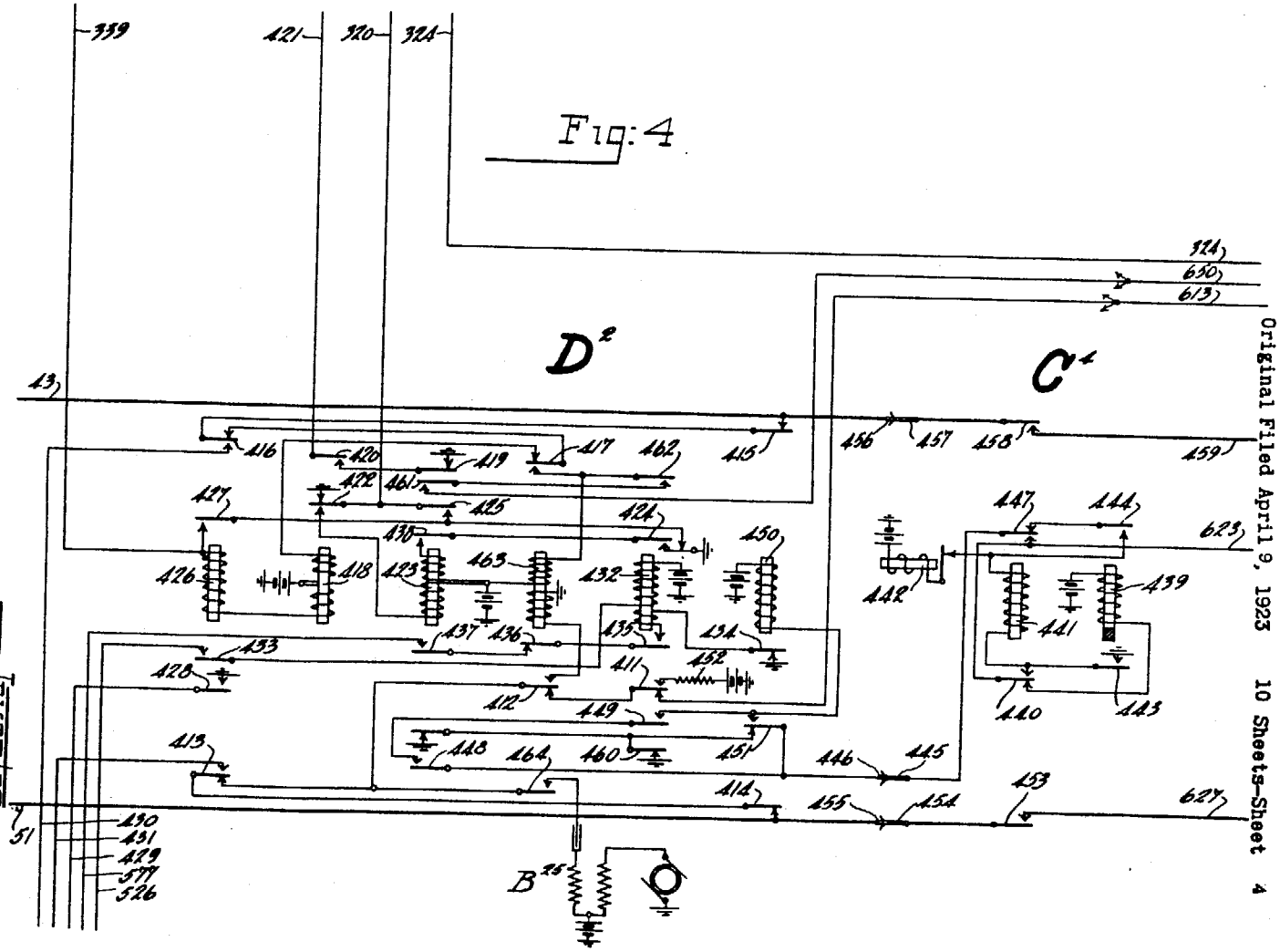
Fig. 4 is a circuit diagram of a trunk relay group $D^2$, and a trunk finder $C^4$.

In Fig. 4 will be found the trunk relay group $D^2$ upon which the inner-office trunk is terminated. The trunk finder $C^4$ is a rotary switch similar to the coder selecting line switch $C^3$. A plurality of trunk relay groups, such as the relay group $D^2$, is provided at each manual position. Each trunk relay group in the position terminates upon a set of contacts in the multiple banks accessible to trunk finders, such as trunk finder $C^4$.

Figure 5:
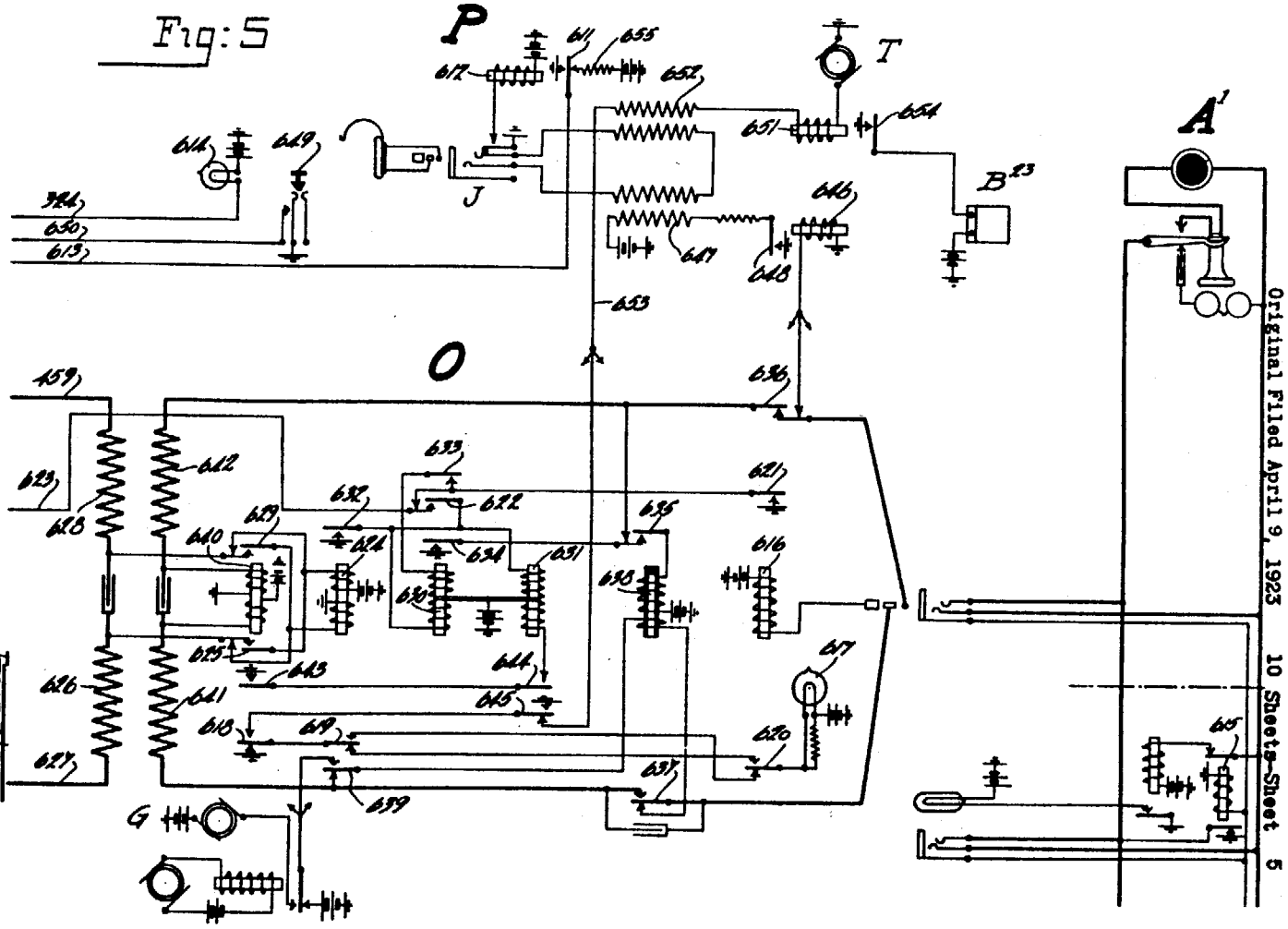
Fig. 5 is a circuit diagram of a cord circuit O, an operator's receiving equipment P, and the manual substation A′, together with its associated line and cut-off relay equipment.

Fig. 5 shows the plug ending cord circuit O. Each cord circuit O will have in association a trunk finder such as the trunk finder $C^4$ of Fig. 4. In practice, the number of cord circuits O and associated trunk finder switches $C^4$ will be sufficient to care for the maximum number of simultaneous connections likely to occur in the position. The number of cord circuits will usually be less than the number of trunk relay groups to which they have access. The manual telephone substation A′ has the usual talking and signalling instrumentalities. An operator's receiving circuit or head set is shown at P.

Figure 6:
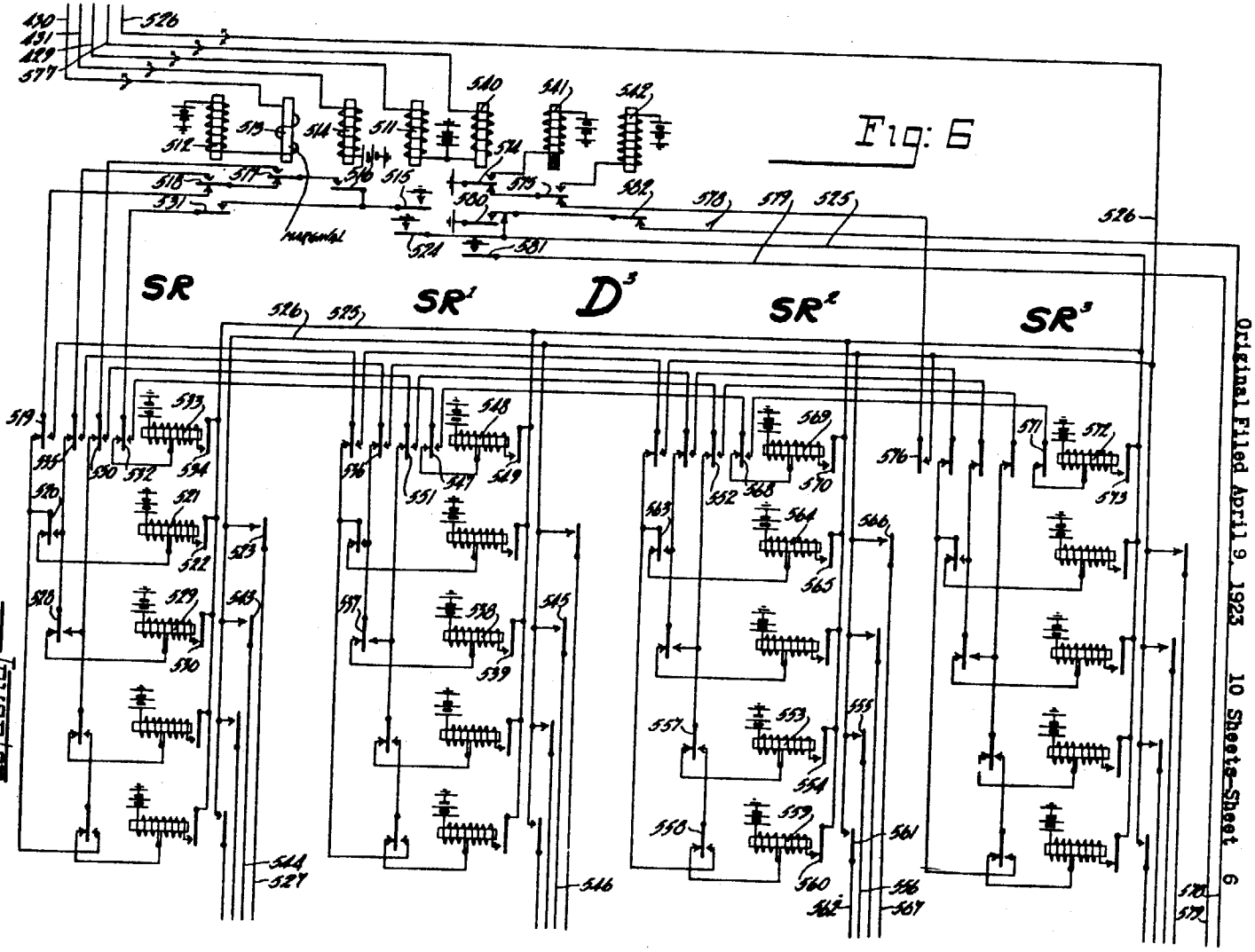
Fig. 6 is a circuit diagram of a decoder $D^3$.

Referring to Fig. 6, this figure shows a decoder $D^3$. The relays 511 to 514, inclusive, and 540 to 542, inclusive, are control relays which govern the operation of the set-up relays SR. Four groups of set-up relays are indicated, each group being made up of five relays. Each of the five relays is a two step relay. Considering relay 533, for example, the energization of its left hand winding will cause it to partially operate and prepare the circuit for its right hand winding. When the energizing circuit is opened, a shunt will be removed from around the right hand winding, whereupon the relay will become fully operated. The set-up relays SR receive the coded impulse train corresponding to the first digit, the set-up relays $SR^1$ receive the coded impulse train for the second digit, the set-up relays $SR^2$ receive the coded impulse train for the third digit, while the set-up relays $SR^3$ receive the coded impulse train for the fourth digit.

Figure 7:
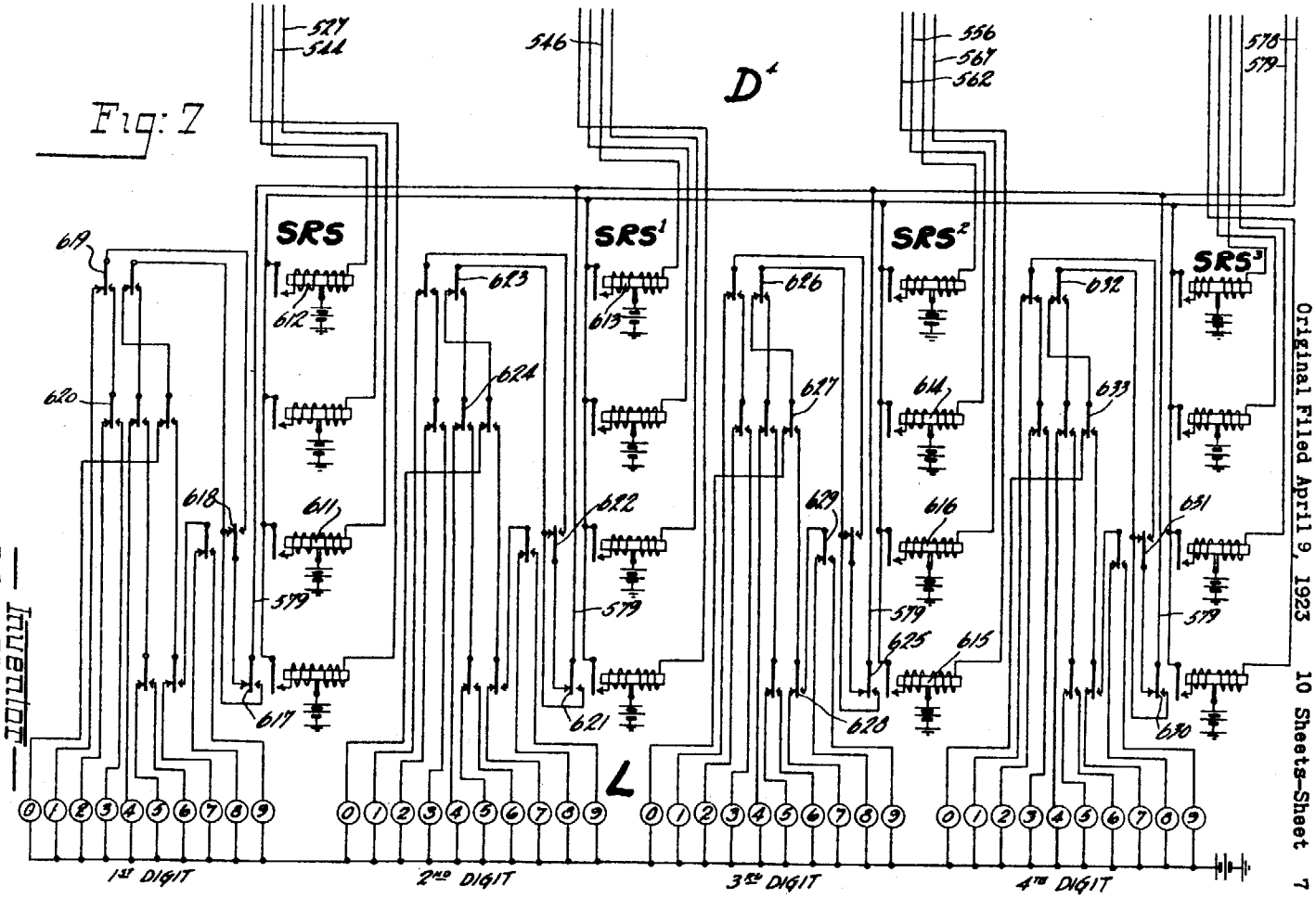
Fig. 7 is a circuit diagram of a storage relay group $D^4$, together with the indicating device L, which will be hereinafter referred to as the call indicator lamps.

In Fig. 7 will be found the storage relay group $D^4$, and the call indicator lamps L. Four sets of storage relays are indicated, each set being made up of four relays. The relays in the storage relay set SRS are controlled by the set-up relays SR. The relays in the storage relay set $SRS^1$ are controlled by the set-up relays $SR^1$. The storage relay set $SRS^2$ is controlled by the set-up relays $SR^2$. The storage relay set $SRS^3$ is controlled by the set-up relays $SR^3$. The circuit to the first digit call indicator lamps is controlled by the storage relay set SRS. The circuit to the second digit call indicator lamps is controlled by the storage relay set $SRS^1$. The circuit to the third digit call indicator lamps is controlled by the storage relay set $SRS^2$. The circuit to the fourth digit call indicator lamps is controlled by storage relay set $SRS^3$.

Figure 8:
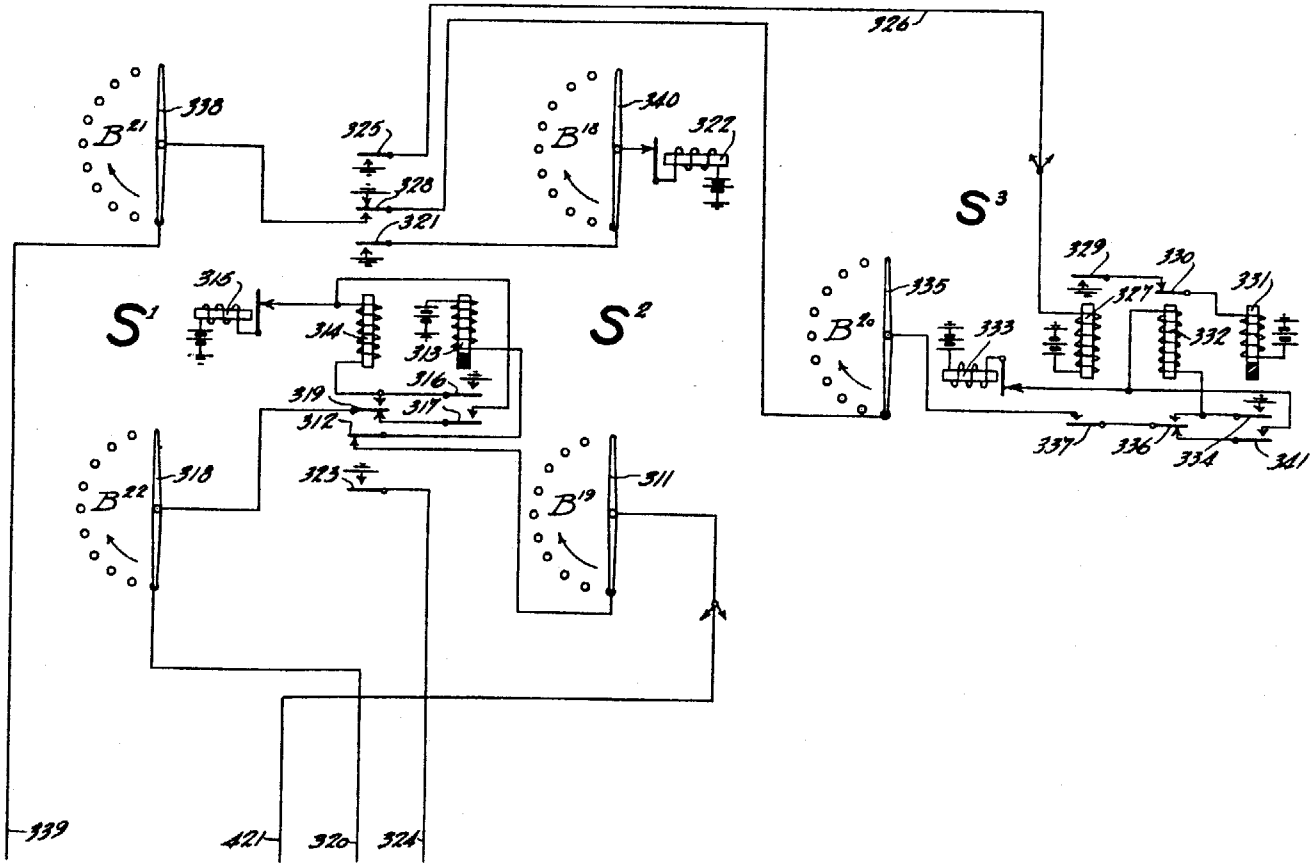
Fig. 8 is a circuit diagram of a marker distributer $S^2$, a marker $S^1$, and a set-up control switch $S^3$.

Referring to Fig. 8, we find the marker distributer $S^2$, which advances the wipers 311 and 340 over the banks $B^{19}$ and $B^{18}$, respectively. The marker $S^1$ advances the wipers 318 and 338 over the banks $B^{22}$ and $B^{21}$, respectively. The set-up control switch $S^3$ advances the wiper 335 over the bank $B^{20}$. These switches are all similar to the coder, selecting line switch $C^3$. There is one marker distributer, such as the switch $S^2$, provided for each position. The wiper 311 of switch $S^2$ is connected to a starting conductor common which is multipled through each trunk relay group in the position. Upon each contact in the bank $B^{10}$ is terminated a start conductor which leads to a marker, such as the switch $S^1$. In practice, a number of markers would be provided equal to the maximum number of simultaneous uncompleted calls likely to occur in the position, usually about six or seven. Each marker is associated with a test contact in bank $B^{18}$, which serves to advance the marker distributer $S^2$ when the marker in question is seized. A test conductor from each trunk relay group in the position terminates in the bank $B^{22}$. An operating conductor from each trunk relay group terminates upon a contact in the bank $B^{21}$. The relay 327 of the set-up control switch $S^3$ is connected to a starting common which is multipled through each marker in the position. A test conductor from each marker is terminated upon a contact in the bank $B^{20}$.

The code used to transfer the call number set up on the digit registers utilizes each side of the inter-office trunk separately. Each train consists of from one to three ground impulses over the pulsing trunk conductor. Three conditions are imposed upon the control trunk conductor, i. e., neutral, high resistance ground, or low resistance ground.

Figures 10, 11:
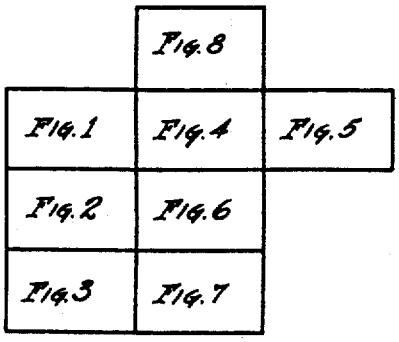
Fig. 10 is a chart showing the digits 1 to 0, inclusive, and the corresponding code trains.
Fig. 11 is a layout showing how sheets 1 to 8, inclusive, should be joined together.

The three possible conditions on each trunk conductor allow of nine combinations, which correspond to the digits 1 to 9, inclusive, as shown in Fig. 10. The code for the digit zero is obtained by the combination of a neutral control trunk conductor and no impulses on the pulsing trunk conductor. The circuit change which is necessary at the decoder between the end of one code train and the beginning of the next, is brought about by a momentary grounding of the control trunk conductor.

Referring to the sending switch S, Fig. 2, it may be said that at the proper time the wiper 133 becomes associated with the control trunk conductor, while the wiper 135 becomes associated with the pulsing trunk conductor. It will be noted that the contacts 4, 8, 12 and 16 in bank $B^{16}$, are multipled to the armature 142. These are the switching points which control the change over circuit at the decoder. The first train of coded impulses is delivered while the switch S is passing over bank contacts 1, 2 and 3, the second train while passing over contacts 5, 6 and 7, the third train while passing over contacts 9, 10 and 11, while the fourth train is delivered while passing over contacts 13, 14 and 15. The seventeenth contact in bank $B^{15}$ is reached after the complete code has been sent, and is utilized to cause the release of the coder. The remaining contacts in bank $B^{15}$ are multiplied and serve to insure that the switch S will return to normal upon the release of the coder.

Contacts 1, 2 and 3 of bank $B^{16}$ are multipled and carried by conductor 144 to contacts 7, 8 and 9 in bank $B^{10}$ of the first digit register $M^1$, Fig. 3. Contacts 4, 5 and 6 of the same bank are connected through the high resistance 250 to conductor 144. From the foregoing it is evident that conductor 144 will be ungrounded if the digit registered upon switch $M^1$ be a 1, a 2, a 3, or a 0. It follows therefore, that the control trunk conductor will be neutral while the sending switch is advancing over the first, second and third bank contacts. If the digit registered upon switch $M^1$ be a 4, a 5, or a 6, the conductor 144 will be grounded through resistance 250, and the control trunk conductor will have a high resistance ground placed upon it while the switch S is advancing over the first, second and third bank contacts. If the digit registered upon switch $M^1$ be a 7, an 8, or a 9, the conductor 144 will be grounded directly and the control trunk conductor will have direct ground placed upon it while the switch S is advancing over the first, second and third bank contacts.

Contacts 5, 6 and 7 of bank $B^{16}$ are multipled and carried by conductor 147 to contacts 7, 8 and 9 of bank $B^7$ of the second digit register $M^2$. Contacts 4, 5 and 6 of the same bank are connected through the high resistance 251 to conductor 147.

Contacts 9, 10 and 11 of bank $B^{16}$ are multipled and carried by conductor 150 to contacts 7, 8 and 9 of bank $B^4$ of the third digit register $M^3$. Contacts 4, 5 and 6 of the same bank are connected through the high resistance 252 to conductor 150.

Contacts 13, 14 and 15 of the bank $B^{16}$ are multipled and carried by conductor 153 to contacts 7, 8 and 9 of bank $B^1$ of the fourth digit register $M^4$. Contacts 4, 5 and 6 of the same bank are connected through the high resistance 253 to conductor 153.

To summarize; it may be said that the condition of the control trunk conductor during the transmission of the first code train is determined by the position of wiper 230 of the first digit register $M^1$. Its condition during the transmission of the second code train is determined by the position of the wiper 233 of switch $M^2$, during the transmission of the third code train by the position of the wiper 236 of switch $M^3$, while its condition during the fourth train is determined by the position of wipers 239 of switch $M^4$.

The grounding of the pulsing trunk conductor will now be explained. The first contact in bank $B^{17}$ of switch S is carried by conductor 145 to the multipled contacts 1, 3, 4, 6, 7 and 9 in bank $B^{12}$ of the first digit register $M^1$. The second and third contacts in bank $B^{17}$ are multipled and carried by conductor 146 to contacts 2, 5 and 8 in bank $B^{12}$ and contacts 3, 6 and 9 in bank $B^{11}$. From the foregoing it is evident that conductor 145, only, will be grounded if the digit registered upon the switch $M^1$ be a 1, a 4, or a 7. It follows, therefore, that only one impulse will be delivered to the pulsing trunk conductor while the sending switch is advancing over the first, second and third bank contact. If the digit registered upon switch $M^1$ be a 2, a 5, or an 8, the conductor 146, only, will be grounded and two impulses will be delivered to the pulsing trunk conductor while the sending switch is advancing over the first, second and third bank contacts. If the digit registered upon switch $M^1$ be a 3, a 6, or a 9, both conductor 145 and conductor 146 will be grounded and three impulses will be delivered to the impulsing trunk conductor while the sending switch is advancing over the first, second and third bank contacts.

Contact 5 of bank $B^{17}$ is carried by conductor 148 to the multipled contacts 1, 3, 4, 6, 7, and 9 in bank $B^9$ of the second digit register $M^2$. The sixth and seventh contacts in bank $B^{17}$ are multipled and carried by conductor 149 to contacts 2, 5 and 8 in bank $B^9$ and to contacts 3, 6 and 9 in bank $B^8$.

Contact 9 of bank $B^{17}$ is carried by conductor 151 to the multipled contacts 1, 3, 4, 6, 7 and 9 in bank $B^6$ of the third digit register $M^3$. The tenth and eleventh contacts in bank $B^{17}$ are multipled and carried by conductor 152 to contacts 2, 5 and 8 in bank $B^6$ and to contacts 3, 6 and 9 in bank $B^5$.

Contact 13 of bank $B^{17}$ is carried by conductor 154 to the multipled contacts 1, 3, 4, 6, 7 and 9 in bank $B^3$ of the fourth digit register $M^4$. The fourteenth and fifteenth contacts in bank $B^{17}$ are multipled and carried by conductor 155 to contacts 2, 5 and 8 in bank $B^3$ and to contacts 3, 6 and 9 in bank $B^2$.

To summarize; it may be said that the number of grounded impulses delivered to the pulsing trunk conductor during the transmission of the first code train is determined by the position of wipers 231 and 232 of the first digit register $M^1$. The number delivered during the transmission of the second code train is determined by the position of wipers 234 and 235 of the second digit register $M^2$ during the transmission of the third code train by the position of wipers 237 and 238 of the third digit register $M^3$, while the number of impulses delivered to the pulsing conductor during the fourth code train is determined by the position of wipers 240 and 241.

The general object and scope of the invention having been pointed out, the operation of of the apparatus involved will now be described more in detail, and for this purpose tablish connection with the subscriber at the automatic substation A, Fig. 9, desires to establish connection with the subscriber at the manual substation A′, whose telephone number is assumed to be 32490. When the receiver is removed at substation A, the calling line is extended in the well known manner to a first selector, such as the selector F, by means of the primary line switch C. When the calling subscriber operates his calling device for the first digit 3 of the called number, a first selector F will raise its shaft and wipers opposite the third level of bank contacts, whereupon it will rotate in search of an idle trunk. It will be assumed that the first selector F connects with a set of bank contacts indicated by reference characters 10, 11 and 12, Fig. 1. The two conductors of the calling line are now connected with trunk conductors 13 and 14 and a circuit will be completed over the said trunk conductors through springs 15 and 16, of relay 52, and their resting contacts, to the line relay 17 of repeater D.

When the line relay 17 becomes energized, a circuit will be closed for the slow acting release relay 19 at armature 18. The latter relay, upon energizing, will place ground upon release trunk 20 by way of armature 21, thereby completing a holding circuit for the preceding switches in the usual manner. A further result of the energization of relay 19 is the closure of a circuit traceable from ground, working contact and armature 22, through the upper winding of the electro-polarized relay 23 to battery. This is without effect, as the upper winding of relay 23 is not strong enough to operate the associated armatures. A further result of the energization of relay 19 is the closure of a circuit from ground, working contact and armature 22, armature 24 and its resting contact, armature 25 and its resting contact, through line relay 26 of the coder selecting line switch $C^3$ to battery. Relay 26, upon energizing, closes a circuit for the switching relay 27 in series with the stepping magnet 28 at armature 29, and at armature 30 connects the test wiper 31 to the above circuit at a point between the winding of the switching relay and the winding of the stepping magnet. If the trunk with which the wipers of the coder selecting line switch are now associated is busy, there will be a ground on the test contact with which the test wiper 31 is in engagement. The switching relay 27 will be short circuited, and the stepping magnet 28 will be operated to advance the switch wipers into engagement with the next trunk line. If the next trunk line is busy the same operation will be repeated, and the stepping magnet 28 will continue to operate in the manner of a buzzer to advance the switch wipers step by step until an idle trunk line is encountered. If the trunk line with which the wipers of the line switch are associated is idle, there will be no ground potential on the test contact engaged by the test wiper 31 and the switching relay 27 will not be short circuited, but will be immediately energized in series with the stepping magnet 28, the said magnet remaining inoperative due to the high resistance of the switching relay. When the switching relay 27 becomes energized, ground at armature 29 of relay 26 is connected through working contact and armature 32, through test wiper 31 to test contact 34 and its multiples in the banks of other coder selecting line switches, in order to make the selected coder busy. A further result of the energization of relay 27 is the closure of a circuit traceable from ground, working contact and armature 29, working contact and armature 33, armature 53 and its resting contact, armature 35 and its working contact, through relay 36 to battery. Relay 36, upon energizing, forms a locking circuit for itself, independent of relay 26, which may be traced from ground, working contact and armature 22, armature 24 and its resting contact, armature 25 and its working contact, armature 35 and its working contact, through relay 36 to battery. A further result of the energization of relay 36 is the regrounding of release trunk conductor 42 over a circuit traceable from ground, working contact and armature 22, armature 24 and its resting contact, contact controlled by armature 37, working contact and armature 53, armature 33 and its working contact, working contact and armature 32, test wiper 31 to test contact 34, and release trunk conductor 42. The above circuit will maintain ground upon release conductor 42 after the deenergization of the slow acting line relay 26, which will take place shortly after its circuit is opened at armature 25 of relay 36. In order to insure the proper operation of relay 36, the springs are so adjusted that armature 25 engages its working contact before armature 53 opens its resting contact.

It will now be assumed that the calling subscriber dials the next digit 2 of the called number, as a result of which line relay 17 will momentarily release its armature a like number of times. At each deenergization of relay 17 a circuit may be traced from ground, working contact and armature 22, resting contact and armature 38, armature 39 and its working contact, working contact and armature 40, wiper 54, bank contact 33, conductor 41, slow acting relay 111, Fig. 2, conductor 112, wiper 211, Fig. 3, first contact in bank $B^{14}$, through the stepping magnet 212 of the first digit register $M^1$ to battery. A branch of the above circuit may be traced from conductor 42, contacts controlled by armature 114, through relay 115 to battery. Relay 115, upon energizing, forms a locking circuit for itself, independent of conductor 41, which may be traced from the grounded release trunk conductor 42, armature 114 and its working contact, through relay 115 to battery. A further result of the energization of relay 115 is the removal of ground from conductor 161 at armature 116, thereby removing ground from the off normal springs ONS associated with the master digit controller M, and the digit registers $M^1$, to $M^4$, inclusive, Fig. 3.

The stepping magnet 212 of the first digit register $M^1$ will respond to the impulses delivered to it and will advance the wipers 230, 231 and 232 into engagement with the second contact in the banks $B^{10}$, $B^{11}$ and $B^{12}$, respectively. The slow acting relay 111 will energize at the first impulse and will remain operated throughout the period that impulses are passing through it. Relay 111, upon energizing, will close the circuit of slow acting relay 119 by way of armature 118. When relay 111 deenergizes, shortly after the last impulse has passed through it, the circuit of slow acting relay 119 will be opened, and a circuit will be closed from ground, armature 118 and its resting contact, armature 120 and its working contact, armature 121 and its resting contact, conductor 122, through stepping magnet 213 of the master digit controller M to battery. The stepping magnet 213 will now energize and advance wipers 211 and 217 into engagement with the second contact in the banks $B^{14}$ and $B^{13}$, respectively. The deenergization of slow acting relay 119 will occur shortly after its circuit is opened at armature 118. When this takes place the circuit of stepping magnet 213 will be opened at armature 120.

It will now be assumed that the calling subscriber operates his calling device for the next digit 4 of the called number, as a result of which the line relay 17 will momentarily deenergize a like number of times. At each deenergization of relay 17, a ground is placed upon conductor 112 over the previously traced circuit, which continues through the wiper 211 in second position to the stepping magnet 214 of the second digit register $M^2$ to battery. The stepping magnet 214 will energize four times and operate to advance the wipers 233, 234 and 235 into engagement with the fourth contact in the banks $B^7$, $B^8$ and $B^9$, respectively. The relays 111 and 119 will operate as before to send an impulse of current through the stepping magnet 213 of switch M, whereupon the wipers 211 and 217 will be moved into engagement with the third contact in the banks $B^{14}$ and $B^{13}$, respectively.

It will now be assumed that the calling subscriber operates the calling device in accordance with the next digit 9 of the called number, as a result of which the line relay 17 will momentarily deenergize nine times. At each deenergization of relay 17 the usual circuit is extended to the wiper 211 of switch M, the circuit continuing through the third contact in bank $B^{14}$, through stepping magnet 215 of the third digit register $M^3$ to battery. The stepping magnet 215 will energize nine times, and will operate to advance the wipers 236, 237 and 238 into engagement with the ninth contact in the banks $B^4$, $B^5$ and $B^6$, respectively. The relays 111 and 119 will operate in the usual manner to send an impulse of current through stepping magnet 213 of switch M, whereupon the wipers 211 and 217 are advanced into engagement with the fourth contact in the banks $B^{14}$ and $B^{13}$, respectively.

It will now be assumed that the calling subscriber operates his calling device for the last digit 0 in the called number, as a result of which the line relay 17 will momentarily release its armature ten times. At each deenergization of relay 17, the usual circuit is extended to wiper 211 of switch M, the circuit continuing through the fourth contact in the bank $B^{14}$, through stepping relay 216 of the fourth digit register $M^4$ to battery. Stepping magnet 216 will energize ten times and operate to advance the wipers 239, 240 and 241 into engagement with the tenth contact in the banks $B^1$, $B^2$ and $B^3$, respectively. The relays 111 and 119 will operate as before to cause an impulse of current to be delivered to the stepping magnet 213 of switch M, whereupon the wipers 211 and 217 are advanced into engagement with the fifth contact in the banks $B^{14}$ and $B^{13}$, respectively.

When wiper 217 of switch M engages the fifth contact in the bank $B^{13}$, a circuit may be traced from grounded release trunk conductor 42, wiper 217 in fifth position, conductor 218, resting contact and armature 125, through lower winding of relay 126 to battery. Relay 126, upon energizing, places its upper winding in bridge of the inter-office trunk, whereupon a circuit may be traced from ground, working contact and armature 611 of position busying relay 612, Fig. 5, conductor 613, resting contact and armature 411, Fig. 4, resting contact and armature 412, resting contact and armature 413, armature 414 and its resting contact, pulsing trunk conductor 51, armature 50 and its resting contact, Fig. 1, armature 49 and its working contact, wiper 48, bank contact 35, conductor 129, armature 128 and its resting contact, Fig. 2, armature 127 and its working contact, upper winding of relay 126, conductor 47, bank contact 32, Fig. 1, wiper 46, armature 45 and its working contact, resting contact and armature 44, control trunk conductor 43, resting contact and armature 415, Fig. 4, armature 416 and its resting contact, armature 417 and its resting contact, through the upper winding of relay 418 to battery. A further result of the energization of relay 126, Fig. 2, is the closing of a circuit through relay 131 by way of armature 130. Relay 131, upon energizing, forms a locking circuit for itself, independent of relay 126, which may be traced from grounded release trunk conductor 42, armature 132 and its working contact, through relay 131 to battery. A further result of the energization of relay 131 is the opening of the circuit for the lower winding of relay 126 at armature 125, and the opening of the circuit for the stepping magnet 213 of switch M at armature 121. In order to insure the proper operation of relay 126, the spring adjustment is such that armature 127 will engage its working contact before armature 130 engages its working contact.

To return to the consideration of the trunk relay group $D^2$, Fig. 4, it may be said that relay 418 will energize over the previously traced circuit and operate to remove ground, by way of armature 422 and conductor 320, from the contacts associated with the trunk relay group $D^2$ in the multiple test banks of the markers. A further result of the operation of relay 418 is the grounding of the common start conductor leading to the marker distributer $S^2$, Fig. 8. For the sake of explanation we may assume that the marker distributer has preselected the marker $S^1$ as the next marker to be used; therefore, when relay 418 becomes energized a circuit is closed from ground, resting contact and armature 419, working contact and armature 420, start conductor 421, wiper 311 of the marker distributer $S^2$, first contact in bank $B^{19}$, resting contact and armature 312, through line relay 313 to battery. Line relay 313, upon energizing, closes a circuit for switching relay 314 and stepping magnet 315 in series at armature 316, and at armature 317 connects test wiper 318 to the junction of switching relay 314 and stepping magnet 315. The marker $S^1$ will now operate in the usual manner to seek an ungrounded contact in the test bank $B^{22}$. When the ungrounded test contact associated with the trunk relay group $D^2$ is reached the switching relay 314 will energize and open the circuit of relay 313 at armature 312.

As relay 313 is slow to deenergize a circuit will momentarily be closed from ground, working contact and armature 316, working contact and armature 319, wiper 318 and the contact upon which it is now standing, marker release trunk conductor 320, armature 422 and its working contact, Fig. 4, through the lower winding of relay 423 to battery. Relay 423 will energize over the above traced circuit and will place ground upon marker release trunk conductor 320 by way of the resting contact controlled by armature 424 and the working contact and armature 425. This ground will maintain switching relay 314 of marker $S^1$ energized after relay 313 has deenergized, and will also make the trunk relay group $D^2$ busy in the multiple test banks of the markers. A further result of the energization of relay 423 is the removal of ground from the starting conductor 421 at armature 419.

A further result of the energization of switching relay 314 is the placing of ground by way of armature 321, upon the contact associated with the marker $S^1$ in bank $B^{18}$ of the marker distributer $S^2$, whereupon the motor magnet 322 of marker distributer $S^2$ will operate to advance the marker distributer $S^2$ into engagement with the next marker. A still further result of the energization of relay 314 is the closure of a circuit from ground, working contact and armature 323, conductor 324, through the lamp 614, Fig. 5, to battery. A lamp is lighted whenever a marker is taken for use, in order that the operator may know how many calls are ahead of her.

A still further result of the energization of switching relay 314 is the removal of ground, by way of armature 328, from the contact associated with the marker $S^1$ in the bank $B^{20}$ of the set-up control switch $S^3$. A still further result of the energization of relay 314 is the closure of a circuit from ground, working contact and armature 325, common starting conductor 326, through relay 327 of the set-up control switch $S^3$ to battery. For the purpose of explanation we may assume that the set-up control switch $S^3$ is at this time in connection with some marker other than the marker $S^1$. The switching relay 332 is therefore energized, and the energization of relay 327 is without effect because of the open circuit at armature 330. When the marker with which the switch $S^3$ is in engagement completes its operation the switching relay 332 will deenergize, whereupon a circuit is closed from ground, working contact and armature 329, resting contact and armature 330, through line relay 331 to battery. Relay 331, upon energizing, will close a circuit for the switching relay 332 and the stepping magnet 333 in series at armature 334, and at armature 341 connects the wiper 335 to the junction of switching relay 332 and stepping magnet 333. The set-up control switch $S^3$ will now operate in the usual manner to seek an ungrounded contact in the bank $B^{20}$. When the ungrounded contact associated with the marker $S^1$ is reached the switching relay 332 will energize and open the circuit of line relay 331 at armature 330. As relay 331 is slow to deenergize a circuit will momentarily be closed from ground, working contact and armature 334, working contact and armature 336, armature 337 and its working contact, wiper 335 and the contact with which it is now engaged, armature 328 and its working contact, wiper 338 and the contact with which it is now engaged, conductor 339, through relay 426, Fig. 4, and the lower winding of relay 418 to battery. Relay 426, upon energizing, will place ground upon conductor 339 by way of the resting contact controlled by armature 424, and the armature 427 and its working contact. This ground will maintain the switching relay 332 after the line relay 331 has deenergized.

A further result of the energization of relay 426 is the operation of holding relay 511, Fig. 6, over a circuit traceable from ground, working contact and armature 428, conductor 429, through relay 511 to battery. A still further result of the energization of relay 426 is the extension of the control trunk conductor 43 and the pulsing conductor 51 to the decoder $D^3$. The extension of the control trunk conductor 43 may be traced from resting contact and armature 415, armature 416 and its working contact, conductor 430, through the low resistance relay 513, through the high resistance relay 512 to battery. The extension of the pulsing trunk conductor 51 may be traced from resting contract and armature 414, armature 413 and its working contact, conductor 431, through relay 514 to battery.

The operation just described causes the circuit of the upper winding of relay 126. Fig. 2, to be opened. Relay 126, upon deenergizing, closes a circuit traceable from ground, armature 130 and its resting contact, working contact and armature 136, through relay 137 to battery. Relay 137, upon energizing, removes ground from certain contacts in bank $B^{15}$ at armature 140, and extends conductor 129 by way of armature 128. A further result of the energization of relay 137 is the closure of a circuit from ground, through the constantly moving interrupter T, armature 138 and its working contact, through pulsing relay 139 to battery.

Relay 139 will energize at the first impulse and will close a circuit through stepping magnet 143 of the sending switch S at armature 141, whereupon the stepping magnet 143 will energize. No movement of the wipers 135, 133 and 156 will take place at this time. A further result of the energization of relay 139 is the removal of ground from certain contacts in the bank $B^{16}$ by way of armature 142, and the completion of the circuit from conductor 129 to wiper 135 of sending switch S by way of armature 134.

At this time a circuit extends from relays 512 and 513, Fig. 6, over the control trunk conductor 43 to the wiper 133 of sending switch S. A circuit also extends at this time from relay 514, Fig. 6, over the pulsing trunk conductor 51 to the wiper 135 of the sending switch S.

When the interrupter T next opens the circuit of relay 139, the said relay will deenergize and open the circuit of stepping magnet 143, whereupon the wipers 135, 133 and 156 will be advanced into engagement with the first contact in their respective banks. As the wiper 230 of the first digit register $M^1$ is in second position, the first contact in bank $B^{16}$ will be open and the control trunk conductor will be neutral. When relay 139 energizes in response to the next impulse, the wipers of the sending switch S will not advance, but armature 134 will close the wiper 135 through to the pulsing trunk conductor 51. As the wiper 232 of the first digit register $M^1$ is in second position, the first contact in bank $B^{17}$ is open and there will be no circuit for relay 514, Fig. 6.

At the next deenergization of relay 139 the stepping magnet 143 will deenergize and advance the wipers 135, 133 and 156 into engagement with the second contact in their respective banks. As wiper 230 of the first digit register $M^1$ is in second position, the second contact in bank $B^{16}$ will be open and the control trunk conductor will be neutral.

At the next energization of relay 139, a circuit may be traced from ground at wiper 232 of the first digit register $M^1$ in second position, conductor 146, second contact in bank $B^{17}$, wiper 135, working contact and armature 134, and over the previously traced circuit to relay 514, Fig. 6.

At the next deenergization of relay 139, the circuit to relay 514, Fig. 6, will be opened, while the stepping magnet 143 will deenergize and advance the wipers 135, 133 and 156 into engagement with the third contact in their respective banks. As armature 230 of the first digit register $M^1$ is in second position, the third contact in bank $B^{16}$ will be open and the control trunk conductor will be neutral. At the next energization of relay 139, a circuit may be traced from ground at wiper 232 of the first digit register $M^1$ in second position, conductor 146, third contact in bank $B^{17}$, wiper 135, working contact and armature 134, and over the previously traced circuit to relay 514, Fig. 6.

When the interrupter T next opens the circuit of relay 139, the said relay will deenergize and open the circuit to relay 514, Fig. 6, and to the stepping magnet 143, whereupon the wipers 135, 133 and 156 will be advanced into engagement with the fourth contact in their respective banks. A circuit may be traced, however, from ground, resting contact and armature 142, fourth contact of bank $B^{16}$ wiper 133, and over the previously traced circuit to relays 513 and 512, Fig. 6. At the next energization of relay 139 the above circuit will be opened at armature 142, but as the fourth contact in bank $B^{17}$ is open there will be no circuit established at this time for relay 514, Fig. 6.

The transmission of the code train representing the digit 2 is now complete. It consisted of two grounded impulses over the pulsing trunk conductor, during a period in which the control trunk conductor was neutral. This was followed by a single grounded impulse over the control trunk conductor. The operation of the decoder $D^3$ in response to the above code train will now be explained.

As a result of the first code train, relays 512 and 513, Fig. 6, will remain at normal while relay 514 will momentarily operate its armature two times. At the first energization of relay 514, a circuit may be traced from ground, working contact and armature 515, armature 516 and its working contact, armature 517 and its resting contact, armature 518 and its resting contact, armature 519 and its resting contact, armature 520 and its resting contact, through the left hand winding of relay 521 to battery. The structure of relay 521 is such that the energization of its left hand winding will operate armature 522, but will not operate armatures 520 and 523. When relay 514 next deenergizes, a shunt will be removed from around the right hand winding of relay 521, whereupon the said relay will be completely energized over a circuit traceable from ground, working contact and armature 524, conductor 525, armature 522 and its working contact, through the two windings of relay 521 in series to battery. A further result of the energization of relay 521 is the extension of display conductor 526, through the working contact and armature 523, conductor 527, to the right hand winding of relay 611, Fig. 7.

At the next energization of relay 514, a circuit is closed from ground, working contact of armature 515, armature 516 and its working contact, armature 517 and its resting contact, armature 518 and its resting contact, armature 519 and its resting contact, armature 520 and its working contact, armature 528 and its resting contact, through the left hand winding of relay 529 to battery. Relay 529 will only operate armature 530 at this time, but when relay 514 deenergizes it will remove a shunt from around the right winding of relay 529, whereupon the said relay will become fully operated from ground on conductor 525 by way of armature 530. A further result of the energization of relay 529 is the extension of display conductor 526, through the working contact and armature 543, conductor 544, to the right hand winding of relay 612, Fig. 7.

The ground impulse delivered over the control trunk conductor causes the energization of both relays 512 and 513. The energization of relay 513 is without effect at this time, but relay 512, upon energizing, completes a circuit from ground, working contact and armature 515, working contact and armature 531, armature 532 and its resting contact, through the left hand winding of relay 533 to battery. Relay 533 will only operate armature 534 at this time. When relay 512 deenergizes following the next energization of relay 139 of the sending switch S, it will remove a shunt from around the right hand winding of relay 533, whereupon the said relay will become fully operated from ground on conductor 525, by way of armature 534. A further result of the energization of relay 533 is the transfer of the operating conductors to the second setup relay group $SR^1$.

Returning to a further consideration of the sending switch S, Fig. 2, it may be said that at the next deenergization of relay 139, the stepping magnet 143 will deenergize and advance the wipers 135, 133 and 156 into engagement with the fifth contact in their respective banks. A circuit may now be traced from ground at wiper 233 of the second digit register $M^2$ in fourth position, resistance 251, conductor 147, fifth contact in bank $B^{16}$, wiper 133, over the previously traced circuit to relays 512 and 513, Fig. 6. At the next energization of relay 139, a circuit may be traced from ground at wiper 235 of the second digit register $M^2$ in fourth position, conductor 148, fifth contact in bank $B^{17}$, wiper 135, working contact and armature 134 over the previously traced circuit to relay 514, Fig. 6.

At the next deenergization of relay 139, the circuit to relay 514, Fig. 6, will be opened, while the stepping magnet 143 will deenergize and advance the wipers 135, 133 and 156 into engagement with the sixth contact in their respective banks. As the fifth, sixth and seventh contacts in bank $B^{16}$ are in multiple, the circuit is still maintained to relays 512 and 513, Fig. 6. It may also be said that the wiper 133 engages the next contact in the bank before breaking connection with the preceding contact, thus the circuit to relays 512 and 513 is not opened as the wiper 133 advances from contact to contact. When relay 139 energizes in response to the next impulse, the wipers of the sending switch S will not advance, but armature 134 will close the wiper 135 through to the pulsing trunk conductor 51. As the wiper 235 of the second digit register $M^2$ is in fourth position, the sixth contact in bank $B^{17}$ is open and there will be no circuit for relay 514, Fig. 6.

At the next deenergization of relay 139, the stepping magnet 143 will deenergize and advance the wipers 135, 133 and 156 into engagement with the seventh contact in their respective banks. As the fifth, sixth and seventh contacts in bank $B^{16}$ are in multiple the circuit is still maintained to relays 512 and 513, Fig. 6. When relay 139 energizes in response to the next impulse, the wipers of the sending switch S will not advance, but the armature 134 will close the wiper 135 through to the pulsing trunk conductor 51. As the wiper 235 of the second digit register $M^2$ is in fourth position, the sixth contact in bank $B^{17}$ is open and there will be no circuit for relay 514, Fig. 6.

When the interrupter T next opens the circuit of relay 139, the said relay will deenergize and open the circuit of stepping magnet 143, whereupon the wipers 135, 133 and 156 will be advanced into engagement with the eighth contact in their respective banks. As the eighth contact in bank $B^{17}$ is open, there will be no circuit at this time for relay 514, Fig. 6. A circuit may be traced, however, from ground, resting contact and armature 142, eighth contact of bank $B^{16}$, wiper 133, and over the previously traced circuit to relays 513 and 512, Fig. 6, thus replacing the ground previously supplied through the resistance 251, Fig. 3. At the next energization of relay 139, the above circuit will be opened at armature 142.

The transmission of the code train representing the digit 4 is now complete. It consisted of one grounded impulse over the pulsing trunk conductor, during a period in which the control trunk conductor was grounded through a high resistance. After the impulse was delivered the high resistance ground upon the control trunk conductor was momentarily replaced by direct ground, after which the said trunk was cleared. The operation of the decoder $D^3$ in response to the above code train will now be explained.

As a result of the second code train, relay 512, Fig. 6, will be maintained in an operated position while relay 514 momentarily operates its armature. The low resistance relay 513 will not operate at this time due to the high resistance in the circuit. When relay 514 energizes, a circuit may be traced from ground, working contact and armature 515, armature 516 and its working contact, armature 517 and its resting contact, armature 518 and its working contact, armature 535 and its working contact, armature 536 and its resting contact, armature 537 and its resting contact, through the left hand winding of relay 538 to battery. Relay 538 will only operate armature 539 at this time, but when relay 514 deenergizes, it will remove a shunt from around the right hand winding of relay 538, whereupon the said relay will become fully operated from ground on conductor 525 by way of armature 539. A further result of the energization of relay 539 is the extension of display conductor 526 through the working contact and armature 545, conductor 546, to the right hand winding of relay 613, Fig. 7.

The grounding of the control trunk conductor through a high resistance will cause the energization of relay 512, whereupon a circuit is closed from ground, working contact and armature 515, working contact and armature 531, armature 532 and its working contact, armature 547 and its resting contact through the left hand winding of relay 548 to battery. Relay 548 will only operate armature 549 at this time. It will be remembered that the wiper 133 of sending switch S placed direct ground upon the control trunk conductor when it advanced to eighth position. This direct ground not only maintains the circuit of relay 512, but also causes the operation of relay 513, which is without effect at this time. When relay 512 deenergizes, following the next energization of relay 139 of the sending switch S, it will remove a shunt from around the right hand winding of relay 548, whereupon the said relay will become fully operated from ground on conductor 525 by way of armature 549. A further result of the energization of relay 548 is the transfer of the operating conductors to the third set-up relay group $SR^2$.

Returning to a further consideration of the sending switch S, Fig. 2, it may be said that at the next deenergization of relay 139 the stepping magnet 143 will deenergize and advance the wipers 135, 133 and 156 into engagement with the ninth contact in their respective banks. A circuit may now be traced from ground at wiper 236 of the third digit register $M^3$ in ninth position, conductor 150, ninth contact in the bank $B^{16}$, wiper 133, and over the previously traced circuit to relays 512 and 513, Fig. 6. At the next energization of relay 139, a circuit may be traced from ground at wiper 238 of the third digit register $M^3$ in ninth position, conductor 151, ninth contact in bank $B^{17}$, wiper 135, working contact and armature 134, and over the previously traced circuit to relay 514, Fig. 6.

At the next deenergization of relay 139, the circuit to relay 514, Fig. 6, will be open while the stepping magnet 143 will deenergize and advance the wipers 135, 133 and 156 into engagement with the tenth contact in their respective banks. As the ninth, tenth and eleventh contacts in bank $B^{16}$ are in multiple, the circuit to relays 512 and 513, Fig. 6, is still maintained. At the next energization of relay 139, a circuit may be traced from ground at wiper 237 of the third digit register $M^3$ in ninth position, conductor 152, tenth contact in bank $B^{17}$, wiper 135, working contact and armature 134, and over the previously traced circuit to relay 514, Fig. 6.

At the next deenergization of relay 139, stepping magnet 143 will deenergize and advance the wipers 135, 133 and 156 into engagement with the eleventh contact in their respective banks. As the ninth, tenth and eleventh contacts in bank $B^{16}$ are in multiple, the circuit to relays 512 and 513, Fig. 6, is still maintained. At the next energization of relay 139, a circuit may be traced from ground at wiper 237 of the third register $M^3$ in ninth position, conductor 152, eleventh contact in bank $B^{17}$, wiper 135, working contact and armature 134, and over the previously traced circuit to relay 514, Fig. 6.

When the interrupter T next opens the circuit of relay 139, the said relay will deenergize and open the circuit of stepping magnet 143, whereupon the wipers 135, 133 and 156 will be advanced into engagement with the twelfth contact in their respective banks. As the twelfth contact in bank $B^{17}$ is open, there will be no circuit at this time for relay 514, Fig. 6. A circuit may be traced, however, from ground, resting contact and armature 142, twelfth contact of bank $B^{16}$, wiper 133, and over the previously traced circuit to relays 513 and 512, Fig. 6. This replaces the ground previously supplied through wiper 236 of the third digit register $M^3$. At the next energization of relay 139, the above circuit will be open at armature 142.

The transmission of the code train representing the digit 9 is now complete. It consisted of three grounded impulses over the pulsing trunk conductor during a period in which the control trunk conductor was grounded directly. After the impulses were delivered, the direct ground was removed from the control trunk conductor. The operation of the decoder $D^3$ in response to the above code train will now be explained.

As a result of the third code train, relays 512 and 513, Fig. 6, will remain operated while relay 514 will momentarily operate its armature three times. At the first energization of relay 514, a circuit may be traced from ground, working contact and armature 515, armature 516 and its working contact, armature 517 and its working contact, armature 550 and its working contact, armature 551 and its working contact, armature 552 and its resting contact, armature 557 and its resting contact, through the left hand winding of relay 553 to battery. Relay 553 will only operate armature 554 at this time, but when relay 514 deenergizes it will remove a shunt from around the right hand winding of relay 553, whereupon the said relay will become fully operated from ground on conductor 525 by way of armature 554. A further result of the energization of relay 553 is the extension of display conductor 526 through the working contact and armature 555, conductor 556, to the right hand winding of relay 614, Fig. 7.

At the next energization of relay 514, a circuit is closed from ground, working contact and armature 515, armature 516 and its working contact, armature 517 and its working contact, armature 550 and its working contact, armature 551 and its working contact, armature 552 and its resting contact, armature 557 and its working contact, armature 558 and its resting contact, through relay 559 to battery. Relay 559 will only operate armature 560 at this time, but when relay 514 deenergizes it will remove a shunt from around the right hand winding of relay 559, whereupon the said relay will become fully operated from ground on conductor 525 by way of armature 560. A further result of the energization of relay 559 is the extension of display conductor 526 through the working contact and armature 561, conductor 562 to the right hand winding of relay 615, Fig. 7.

At the next energization of relay 514, a circuit is closed from ground, working contact and armature 515, armature 516 and its working contact, armature 517 and its working contact, armature 550 and its working contact, armature 551 and its working contact, armature 552 and its resting contact, armature 557 and its working contact, armature 558 and its working contact, armature 563 and its resting contact, through the right hand winding of relay 564 to battery. Relay 564 will only operate armature 565 at this time, but when relay 514 deenergizes it will remove a shunt from around the right hand winding of relay 564, whereupon the said relay will become fully operated from ground on conductor 525 by way of armature 565. A further result of the energization of relay 564 is the extension of display conductor 526 through the working contact and armature 566, conductor 567, to the right hand winding of relay 616, Fig. 7.

The grounding of the control trunk conductor will cause the operation of relays 512 and 513, whereupon a circuit is closed traceable from ground, working contact and armature 515, working contact and armature 531, armature 532 and its working contact, armature 547 and its working contact, armature 568 and its resting contact, through the right hand winding of relay 569 to battery. Relay 569 will only operate armature 570 at this time. When relay 512 deenergizes following the next energization of relay 139 of the sending switch S it will remove a shunt from around the right hand winding of relay 569, whereupon the said relay will become fully operated from ground on conductor 525 by way of armature 570. A further result of the energization of relay 569 is the transfer of the operating conductors to the fourth set-up relay group $SR^3$.

Returning to a further consideration of the sending switch S, Fig. 2, it may be said at the next deenergization of relay 139 the stepping magnet 143 will deenergize and advance the wipers 135, 133 and 156 into engagement with the thirteenth contact in their respective banks. As the wiper 239 of the fourth digit register $M^4$ is in tenth position, the thirteenth contact in bank $B^{16}$ will be open and the control trunk conductor will be neutral. When relay 139 energizes in response to the next impulse, the wipers of the sending switch S will not advance, but armature 134 will close the wiper 135 through to the pulsing trunk conductor 51. As the wiper 241 of the fourth digit register $M^4$ is in tenth position, the thirteenth contact in bank $B^{17}$ is open and there will be no circuit for relay 514, Fig. 6.

At the next deenergization of relay 139 the stepping magnet 143 will deenergize and advance the wipers 135, 133 and 156 into engagement with the fourteenth contact in their respective banks. As the thirteenth, fourteenth and fifteenth contacts in bank $B^{16}$ are multipled, the control conductor is still neutral. When relay 139 energizes in response to the next impulse, the wipers of the sending switch S will not advance, but the armature 134 will close the wiper 135 through to the pulsing trunk conductor 51. As the wiper 240 of the fourth digit register $M^4$ is in tenth position, the fourteenth contact in bank $B^{17}$ is open, and there will be no circuit for relay 514, Fig. 6.

At the next deenergization of relay 139 stepping magnet 143 will deenergize and advance the wipers 135, 133 and 156 into engagement with the fifteenth contact in their respective banks. As the thirteenth, fourteenth and fifteenth contacts in the bank $B^{16}$ are multipled, the control trunk conductor will remain neutral. When relay 139 energizes in response to the next impulse the wipers of the sending switch will not advance, but the armature 134 will close the wiper 135 through to the pulsing trunk conductor 51. As the contacts fourteen and fifteen in the bank $B^{17}$ are multipled there will be no impulse delivered to the pulsing trunk conductor.

When the interrupter T next opens the circuit of relay 139, the said relay will deenergize and open the circuit of stepping magnet 143, whereupon the wipers 135, 133 and 156 will be advanced into engagement with the sixteenth contact in their respective banks. As the sixteenth contact in bank $B^{17}$ is open there will be no circuit at this time for relay 514, Fig. 6. A circuit may be traced, however, from ground, resting contact and armature 142, fourth contact of bank $B^{16}$, wiper 133, and over the previously traced circuit to relays 513 and 512, Fig. 6. At the next energization of relay 139 the above circuit will be opened at armature 142.

The transmission of the code train representing the digit 0 is now complete. It consisted of no grounded impulses over the pulsing trunk conductor during the period in which the control trunk conductor was neutral. This was followed by a single ground impulse over the control trunk conductor. The operation of the decoder $D^3$ in response to the above code train will now be explained. As a result of the fourth code train, there will be no operation of relays 512, 513 or 514; therefore, the counting relays of the fourth set-up relay group $SR^3$ will remain at normal.

The ground impulse delivered over the control trunk conductor causes the energization of relays 512 and 513, the energization of the latter relay being without effect. Relay 512, upon energizing, completes a circuit from ground, working contact and armature 515, working contact and armature 531, armature 532 and its working contact, armature 547 and its working contact, armature 568 and its working contact, armature 571 and its resting contact, through the right hand winding of relay 572 to battery. Relay 572 will only operate armature 573 at this time, but when relay 512 deenergizes it will remove a shunt from around the right hand winding of relay 572, whereupon the said relay will become fully operated from ground on conductor 525 by way of armature 573.

Returning to the consideration of the sending switch S, it may be said that upon the next deenergization of relay 139 the stepping magnet 143 will advance the wipers 135, 133 and 156 into engagement with the seventeenth contact in their respective banks, whereupon a circuit is closed for relay 157 in series with magnet 143. Relay 157, upon energizing, will close a circuit which may be traced from ground, armature 158 and its working contact, conductor 162, fifth contact in bank $B^{14}$, wiper 211, conductor 112, relay 111, conductor 41, bank contact 33, wiper 54, armature 40 and its working contact, working contact and armature 39, armature 38 and its working contact, through relay 55 to battery. Relay 111 will not energize at this time because of the high resistance of relay 55. Relay 55, however, will energize and form a locking circuit for itself independent of relay 157, which may be traced from ground, working contact and armature 22, armature 24 and its resting contact, working contact and armature 37, through relay 55 to battery. A further result of the energization of relay 55 is the removal of ground from the switching relay 27 at the contact controlled by armature 37, whereupon the coder selecting line switch $C^3$ becomes dissociated from the coder relay group CR. A still further result of the energization of relay 55 is the extension of trunk conductors 13 and 14 to the inter-office trunk conductors 43 and 51, respectively, by way of armatures 44 and 50. Relay 55, at the same time, closes a bridge across trunk conductors 43 and 51, which may be traced from trunk conductor 43, armature 44 and its working contact, armature 56 and its working contact, lower winding of relay 23, normal contacts controlled by armature 57, right hand winding of impedance 58, working contact and armature 50 to trunk conductor 51.

Following the deenergization of switching relay 27 of the coder selecting line switch $C^3$ ground will be removed from the release trunk conductor 42, thus causing the deenergization of relays 131 and 115. Relay 131, upon deenergizing, will open the circuit of relay 137 at armature 136. The latter relay will thus deenergize and open the circuit to the impulsing relay 139 at armature 138, and at the same time will place ground upon certain contacts in the bank $B^{15}$ at armature 140. Relay 115, upon deenergizing, places ground at armature 116, upon the off normal springs of the master digit controller M and the registers $M^1$ to $M^4$, inclusive, whereupon the associated release magnets operate to restore the aforementioned switches to normal.

Returning now to the point where relay 157 was energized in series with magnet 143, the closure of the circuit in question results also in the energization of magnet 143, for relay 157 is of relatively low resistance. The circuit is immediately broken, however, at the interrupter contacts of the magnet and the wipers are accordingly advanced to the eighteenth contact set. As wiper 156 now engages multiple contacts which are grounded by way of armature 140, a circuit will be closed through stepping magnet 143, whereupon the said stepping magnet will operate as a buzzer to restore the wipers 135, 133 and 156 to normal position. The automatic rotation will cease when the wiper 156 leaves the last multiplied bank contact.

The coder comprising the coder relay group CR, the sending switch S, the master digit control switch M and the digit registers $M^1$ to $M^4$, inclusive, is no longer associated with the repeater D, and may be seized by any coder selecting line switch to assist in the establishment of other connections.

Returning to a consideration of the decoder $D^3$, it may be said that a further result of the energization of relay 572 of the set-up relay group $SR^2$ is the placing of ground upon the display conductor 526 over a circuit traceable from ground, armature 574 and its resting contact, armature 575 and its resting contact, through armature 576 and its working contact to the aforementioned display conductor 526. The grounding of the display conductor 526 will cause the energization of the right hand winding of relays 611 and 612 of storage relay set SRS, and of relay 613 of storage relay set $SRS^1$, and of relays 614, 615 and 616 of storage relay set $SRS^2$. The aforementioned relays will energize and each will form a locking circuit for its left hand winding by way of conductor 578, which is at this time grounded from working contact and armature 524 by way of the contact controlled by armature 580, and armature 582 and its resting contact.

A further result of the grounding of display conductor 526 is the closure of a circuit traceable from the said grounded conductor, working contact and armature 433, through the upper winding of relay 432 to battery. Relay 432, upon energizing, will form a locking circuit for its lower winding, which may be traced from ground, resting contact and armature 434, lower winding of relay 432, working contact and armature 435, armature 436 and its resting contact, armature 437 and its working contact, conductor 577, through relay 540 to battery. Relay 540, upon energizing, will remove ground from the display conductor 526 at armature 574, thus opening the circuit to the right hand windings of relays 611 to 616, inclusive, of the storage relay group $D^4$. A further result of the energization of relay 540 is the regrounding of conductor 578 at the working contact of armature 580, thus rendering the conductor 578 independent of the further operation of relay 511. A still further result of the energization of relay 540 is the placing of ground upon conductor 579 by way of the working contact and armature 581. A still further result of the energization of relay 540 is the closure of a circuit for relay 541 at armature 574. The energization of relay 541 is without effect at this time.

The transfer of the coded impulse trains from the set-up relay group $D^3$ to the storage relay group $D^4$ is now complete. The further operation of the storage relay group will not be considered at this time.

Returning to a further consideration of the operation of relay 432 of the trunk relay group $D^2$, it may be said that a circuit will be closed from ground, working contact and armature 424, armature 438 and its working contact, through the upper winding of relay 423 to battery. This is without effect at this time, as relay 423 is already energized. A further result of the energization of relay 432 is the removal of ground from conductors 320 and 339 at the resting contact controlled by armature 424. The removal of ground from conductor 320 will cause the deenergization of switching relay 314 of the marker $S^1$, whereupon the said marker becomes dissociated from the trunk relay group $D^2$. The removal of ground from conductor 339 causes the deenergization of the switching relay 332 of the set-up control switch $S^3$, whereupon the said switch becomes dissociated from the marker $S^1$. The removal of ground from conductor 339 also results in the deenergization of relays 426 and 418. Relay 426, upon deenergizing, will dissociate the trunk relay group $D^2$ from the decoder $D^3$, whereupon the relay 511 will deenergize and remove ground from conductor 525 at armature 524, as a result of which all the operated relays in the decoder $D^3$ will deenergize, with the exception of relays 540 and 541. Relay 418, upon deenergizing, will cause ground to be replaced upon the multiple test contact associated with the trunk relay group $D^2$ in the bank $B^{22}$. A further result of the operation of relay 432 is the connection of battery through resistance 452 to trunk conductor 51, which is without effect at this time. A still further result of the energization of relay 432 is the removal of ground at armature 460 from the multiple test contacts associated with the trunk relay group $D^2$ in the test banks accessible to the trunk finders.

At this time the trunk relay group $D^2$ is still associated with the storage relay group $D^4$. The decoder $D^3$, however, has been released and will become associated with some other relay group as a result of the next operation of the set-up control switch $S^3$.

Returning to a further consideration of the storage relay group $D^4$; as the relays 611 and 612 of storage relay set SRS are energized, a circuit may be traced from the grounded conductor 579, armature 617 and its resting contact, armature 618 and its working contact, armature 619 and its working contact, armature 620 and its resting contact, through the second call indicator lamp in the first digit group to battery.

As relay 613 of the storage relay set $SRS^1$ is energized, a circuit may be traced from the grounded conductor 579, armature 621 and its resting contact, armature 622 and its resting contact, armature 623 and its working contact, armature 624 and its resting contact, through the fourth call indicator lamp in the second digit group to battery.

As relays 614, 615 and 616 of storage relay set $SRS^2$ are energized, a circuit may be traced from grounded conductor 579, armature 625 and its working contact, armature 626 and its resting contact, armature 627 and its working contact, armature 628 and its working contact, armature 629 and its working contact, through the ninth call indicator lamp in the third digit group to battery.

Since there are no relays energized in the storage relay set $SRS^3$ a circuit may be traced from the grounded conductor 579, armature 630 and its resting contact, armature 631 and its resting contact, armature 632 and its resting contact, armature 633 and its resting contact, through the tenth call indicator lamp in the fourth digit group to battery.

At this time the number 2490 is displayed upon the call indicator lamps, thus indicating to the operator that an automatic subscriber has called the number 32490.

The operator may complete the connection to the multiple jack associated with substation A′ by the use of any cord circuit in her position. For the purpose of explanation we will assume that the operator uses the cord circuit O, Fig. 5, and that she tests the called line in the usual manner by touching the tip of the associated plug to the sleeve of the desired multiple jack. If the called line is idle she then inserts the plug into the multiple jack, whereupon a circuit may be traced from ground, cut off relay 615, sleeve of the multiple jack, sleeve of the plug, through relay 616 to battery. Relay 616, upon energizing, closes a circuit through the disconnect lamp 617, which may be traced from ground, resting contact and armature 618, armature 619 and its resting contact, working contact and armature 620, through the disconnect lamp 617 to battery. This circuit will be opened as soon as the line relay 624 becomes operated, and is the standard dark key shelf supervision. A further result of the energization of relay 616 is the closure of a circuit through the line relay 439, Fig. 4, which may be traced from ground, armature 621, contacts controlled by armature 622, conductor 623, armature 440 and its resting contact, through line relay 439 to battery. Relay 439, upon energizing, closes a circuit for the switching relay 441 in series with the stepping magnet 442 at armature 443, and at armature 444 connects the test wiper 445 to the above circuit at a point between the winding of the switching relay and the winding of the stepping magnet. If the contact with which the test wiper of the trunk finder $C^4$ is now associated is grounded, the switching relay 441 will be short circuited and the stepping magnet will be operated to advance the switch wipers into engagement with the next trunk. If the next contact is grounded, the same operation will be repeated and the stepping magnet will continue to operate in the manner of a buzzer to advance the switch wipers step by step until an ungrounded test contact is reached. When the ungrounded test contact 446 associated with the trunk relay group $D^2$ is reached, the switching relay 441 will no longer be short circuited but will immediately energize in series with the stepping magnet 442, the said magnet remaining inoperative due to the high resistance of the switching relay. When relay 441 becomes energized it opens the circuit of line relay 439 at armature 440, at the same time locking itself to the grounded conductor 623. A further result of the operation of relay 441 is the extension of grounded conductor 623 through the working contact and armature 447, through test wiper 445 to test contact 446 and its multiples in other test banks. An extension of the above circuit may be traced from the grounded test contact 446, armature 448 and its working contact, armature 449 and its working contact, through relay 450 to battery. Relay 450, upon energizing, forms a more direct circuit for itself by way of armature 451, thus rendering itself independent of the further operation of relays 423 and 432.

A further result of the energization of relay 450 is the opening of a circuit through the lower winding of relay 432 and relay 540, Fig. 6. Relay 540, upon deenergizing, will open the circuit of relay 541. As the latter relay is slow acting, a circuit is momentarily closed from ground, armature 574 and its resting contact, armature 575 and its working contact, through relay 542 to battery. Relay 542 will energize momentarily over the above traced circuit and will open the circuit conductor 578 at armature 582, thus causing certain relays of the storage relay group $D^4$ to deenergize. If the decoder $D^3$ is idle at the time relay 540 deenergizes the circuit to conductor 578 will be opened at armature 580. But if the decoder is in use relay 511 will be energized and armature 524 will supply ground to conductor 578 after relay 540 deenergizes. It is for this reason that relay 542 must open the circuit to conductor 578. A further result of the deenergization of relay 540 is the removal of ground from conductor 579 at armature 581, thus opening the circuit to the call indicator lamps.

The storage relay group $D^4$ is now in normal position, and will receive the next set of decoded impulse trains as soon as the relay 572 of the set-up relay group $SR^3$ becomes operated.

To return to a further consideration of the trunk relay group $D^2$, a further result of the operation of relay 450 is the removal of the upper winding of relay 418 from conductor 43, and the removal of resistance 452 from conductor 51 by way of armatures 415 and 414, respectively. The calling substation A is now extended to the repeating coil of the cord circuit O over a circuit traceable from ground, lower winding of relay 624, resting contact controlled by armature 625, winding 626 of the repeating coil, conductor 627, working contact and armature 453, wiper 454, bank contact 455, pulsing trunk conductor 51, armature 50 and its working contact, right hand winding of the impedance 58, normal contacts controlled by armature 57, through the lower winding of relay 23, working contact and armature 56, working contact and armature 44, conductor 43, bank contact 456, wiper 457, armature 458 and its working contact, trunk conductor 459, winding 628 of the repeating coil, resting contacts controlled by armature 629, through the upper winding of relay 624 to battery. The current flow in this circuit is in such a direction that relay 23 of the repeater D will not be operated. Relay 624, upon energizing, will open the circuit of disconnect lamp 617, and will close a circuit through the lower winding of relay 630 and the upper winding of relay 631 at armature 632. The energization of relay 631 is without effect at this time. Relay 630, upon energizing, will form a locking circuit for its upper winding by way of armatures 633 and 621, thus rendering it independent of the further operation of relay 624.

A further result of the energization of relay 630 is the operation of armature 622, which places ground on conductor 623 by way of armature 632, in place of the ground supplied from armature 621. This operation places the release of the trunk finder $C^4$ under the control of the calling subscriber. A further result of the energization of relay 630 is the closure of a ringing circuit which may be traced from ground, working contact and armature 634, resting contacts controlled by armature 635, armature 636 and its working contact, tip of the plug and multiple jack, through the called substation A′, ring of the multiple jack and of the plug, armature 637 and its resting contact, lower winding of relay 638, armature 639 and its working contact, through the working contact of the ring interrupter, through the generator G to battery. The operation of the ring interrupter will cause the ringer at the called substation to sound intermittently. The condenser at the called substation will allow no direct current to flow, but when the receiver is removed at substation A′ a direct current path will be provided at the substation, whereupon the lower winding of the relay 638 will energize sufficiently to cause the armature 635 to engage its working contact, whereupon the relay 638 will become fully operated as a result of the energization of its upper winding by way of armatures 634 and 635. A further result of the energization of the relay 638 is the completion of a circuit from the secondary of the repeating coil to the substation A′. A circuit may now be traced from battery, through the lower winding of relay 640, winding 641 of the repeating coil, working contact and armature 637, ring of the plug and the multiple jack, through the called substation A′, tip of the multiple jack and the plug, working contact and armature 636, winding 642 of the repeating coil, through the upper winding of relay 640 to ground. A further result of the energization of relay 640 is the closure of a locking circuit to the lower winding of relay 631 by way of armatures 643 and 644. Relay 631 is thus rendered independent of the further operation of the line relay 624. A further result of the operation of relay 640 is a reversal of the polarity of trunk conductors 459 and 627. As a result of this reversal the two windings of relay 23, Fig. 1, will now assist each other, whereupon the relay will become operated and will close the circuit of relay 52 at armature 63. Relay 52, upon energizing, will reverse the polarity of the calling line. A further result of the energization of relay 52 is the operation of armature 57, which causes the impedance across the trunk conductors 43 and 51 to be increased by including the left hand winding of the impedance 58 in the circuit.

Conversation will now take place as desired. When the calling subscriber restores his receiver to the switchhook the circuit of line relay 17, Fig. 1, will be opened, whereupon the said relay will deenergize and open the circuit of release relay 19. The deenergization of the release relay 19 will remove ground from the release trunk conductor 20 at armature 21, whereupon the release of the preceding switches will take place in the usual manner. A further result of the deenergization of release relay 19 is the opening of the circuits of relay 23, 36 and 55. The deenergization of the latter relay will cause the circuit of line relay 624, Fig. 5, to be opened. The deenergization of the latter relay will remove ground from conductor 623 at armature 632. This will result in the deenergization of the switching relay 441 of the trunk finder $C^4$. Relay 441 upon deenergizing will dissociate the trunk finder $C^4$ from the trunk relay equipment $D^2$, whereupon the relay 450 will deenergize and cause ground to be again placed upon the multiple test contact associated with the trunk relay group $D^2$ in the banks of the trunk finder switches. The trunk relay equipment $D^2$ is now at normal as is the repeater D, and as a result this particular inter-office trunk may be used to extend other connections.

The deenergization of line relay 624 causes disconnect supervision to be given the operator whether the receiver at the called substation has been restored or not. If the receiver is still removed at the called substation relay 640 will be operated, and a circuit may be traced from ground, working contact and armature 645, working contact and armature 618, armature 619 and its resting contact, working contact and armature 620, through disconnect lamp 617 to battery. If the receiver at the called substation has already been restored relay 640 will not be operated, and a circuit may be traced from ground, resting contact and armature 618, armature 619 and its resting contact, working contact and armature 620, through the disconnect lamp 617 to battery. Upon seeing the disconnect lamp 617 lighted, the operator will remove the plug associated with cord circuit O from the multiple jack, thus causing the deenergization of the cut off relay 615 of the called line, and of relay 616 of the cord circuit. Relay 616, upon deenergizing, will open the locking circuit of the upper winding of relay 630 at armature 621. Relay 630, in turn, will deenergize and open the locking circuit of the upper winding of relay 638 at armature 634, whereupon relay 638 will deenergize and again connect one side of its lower winding to the ring of the plug. A further result of the deenergization of relay 616 is the opening of the circuit of the disconnect lamp 617 at armature 620. The cord circuit O is now at normal and may be used in the completion of other calls entering the position.

An explanation will now be given of the operation should the called line be busy. It will be assumed that the called substation A′ is in use when the operator tests the sleeve of the associated multiple jack with the tip of the plug belonging to the cord circuit O. At this time a circuit may be traced from ground, relay 646, resting contact controlled by armature 636, tip of plug, sleeve of multiple jack, through the relay of the cord circuit which is associated with the multiple jack, to battery. Relay 646, upon energizing, will close a circuit through winding 647 of the operator's induction coil at armature 648. The current flowing in this circuit will induce a click in the operator's receiver, thus advising her that the called line is busy. The operator will then momentarily depress the key 649, which causes the busy tone to be placed upon the trunk relay group which at this time is associated with the number displayed upon the call indicator lamps. The cord circuit O does not become associated in any way with the trunk relay group in question, and can be utilized to establish the next connection.

When the key 649 is depressed, ground will be placed on conductor 650 which is multipled to each trunk relay group in the position. In those trunk relay groups which are idle, or those with which a connection has already been established, the mutiple of conductor 650 is open at an armature controlled by the relay corresponding to relay 423 of trunk relay group $D^2$. In that trunk relay group which may be associated with the decoder $D^3$ at this time, the multiple of conductor 650 is open at an armature controlled by the relay corresponding to relay 432 of trunk relay group $D^2$.

There can be only one trunk relay group in the position which, at this time, is associated with the storage relay group. This may be assumed to be the trunk relay group $D^2$, and it is the one which must receive the busy tone as the result of the operation of key 649. As relay 432 is in an operated position a circuit may be traced from the grounded conductor 650, working contact and armature 461, working contact and armature 462, through the upper winding of relay 463 to battery. Relay 463, upon energizing, connects its upper winding to trunk conductor 43 by way of armature 417 and its working contact, and also connects its lower winding to trunk conductor 51 by way of armature 412 and its working contact. The relay 463 now feeds battery and ground over the inter-office trunk and, because of the bridge at the repeater D, will remain energized after the key 649 is restored. The circuit flow over the inter-office trunk is in such a direction that relay 23 of the repeater D will not be operated at this time.

A further result of the energization of relay 463 is placing of a busy tone from the busy tone machine $B^{25}$ upon the trunk conductor 51 by way of working contact and armature 464. This busy tone is audible at the calling substation and advises the calling subscriber that the called number is busy. A further result of the energization of relay 463 is the opening of the circuit to relay 540 of the decoder $D^3$ at armature 436. Relay 540, upon deenergizing, will bring about the release of the storage relay group $D^3$ in the same manner as previously explained.

The trunk relay group $D^2$ is no longer associated with the decoder, the storage relay group, or the cord circuit. When the calling subscriber replaces his receiver the repeater D will release as before explained. The deenergization of relay 55 of the repeater D will open the circuit to relay 463, whereupon the said relay will deenergize, and again place the trunk relay group $D^2$ in normal position.

An explanation will now be given of the operation should the called subscriber desire to make a call before the operator has removed the plug from his multiple jack. For the purpose of explanation it will be assumed that a connection has been completed to substation A′ by means of the cord circuit O. It will furthermore be assumed that both the calling and called subscribers have restored their receivers, the disconnect lamp 617 lighting as previously explained. If the called subscriber should remove his receiver before the operator has removed the plug from the multiple jack, relay 640 will energize, and, since relay 631 has deenergized, a circuit may be traced from ground, through interrupter T, relay 651, winding 652 of the operator's induction coil, multipled conductor 653, resting contact and armature 645, working contact and armature 618, armature 619 and its resting contact, working contact and armature 620, through the disconnect lamp 617 to battery. The current flow in the above traced circuit will cause a series of clicks to be heard in the operator's receiver, thus advising her that a called subscriber is attempting to make another call. The disconnect lamp 617 will flash and indicate to the operator which cord circuit is associated with the called subscriber who desires to make the new call. The relay 651 will operate to close the circuit of the buzzer $B^{23}$ at armature 654, thus giving an audible signal. As a result of the foregoing the operator will remove the plug associated with the cord circuit O from the multiple jack, whereupon the relays of the cord circuit restore to normal as previously explained. When the plug is removed from the multiple jack the cut off relay associated with the called line will deenergize, and the line lamp will light as in regular manual practice. The disconnect lamp 617 is bridged by a resistance in order that relay 651 may operate even though the lamp 617 should be burned out. This feature obviates the possibility of a called line being tied up indefinitely on account of a burned out disconnect lamp.

An explanation will now be given of the position busying feature which provides for the busying of every inter-office trunk terminating in the position as the result of the removal of the operator's head set from the associated jack. Referring to Fig. 5, it will be seen that the relay 612 of operator's equipment P will be energized as long as the plug associated with the operator's head set is in the jack J. When relay 612 is energized, ground is placed on conductor 613 at armature 611. The said conductor is multipled to each trunk relay group in the position, and is utilized as previously explained. When it is desired to busy the position the plug is removed from the jack J, whereupon relay 612 will deenergize and place battery, through resistance 655, upon conductor 613. A circuit will now be closed to the repeater in the automatic office which is associated with each idle inter-office trunk terminating in the position. In the case of repeater D, Fig. 1, the circuit may be traced from ground, lower winding of relay 63, armature 64 and its resting contact, resting contact and armature 49, resting contact and armature 50, trunk conductor 51, resting contact and armature 414, Fig. 4, armature 413 and its resting contact, armature 412 and its resting contact, armature 411 and its resting contact, conductor 613, armature 611 and its resting contact, Fig. 5, through resistance 655 to battery. The relay 63 will energize over this circuit and place ground on the release trunk conductor 20 by way of armature 65, thus making the repeater busy.

If a connection has been completed on an inter-office trunk at the time the plug is removed from the jack J, the circuit to the trunk conductor corresponding to the conductor 51, Fig. 4, will be open at armature 414. If a connection has been extended only as far as the repeater at the time that the plug is removed from jack J, the circuit to the relay corresponding to the relay 63, Fig. 1, will be open at armature 64. Any calls which may have been started previous to the busying of the position will come through to the call indicator lamps in the usual way. The operator at an adjacent position will now test the called line with a cord circuit in her position, and if the called line is found idle she will then complete the connection with a cord circuit in the busied position.

If a calling subscriber should release an inter-office connection during the time that the position with which it is associated is busy, it is imperative that ground must be removed from the release trunk at the automatic office in order to release the preceding switches, after which ground must be replaced on the release trunk to busy the repeater. In explanation it will be assumed that a connection is established over the inter-office trunk shown in the drawings at the time the plug is removed from the jack J. When the calling subscriber restores his receiver the relays 17, 19, 36 and 55, Fig. 1, will deenergize as previously explained. The deenergization of relay 19 will remove ground from the release trunk conductor 20. The deenergization of relay 55 will bring about the release of relay 624, Fig. 5, and of relays 441 and 450, Fig. 4, as previously explained. When relay 450 deenergizes, conductor 613 is connected to trunk conductor 51 over the previously traced circuit, but relay 63 is not immediately energized on account of the open circuit at armature 64. When relay 19 deenergized it opened the circuit of relay 36, the said relay, being slow acting, will maintain armature 64 in an operated position for a certain length of time. When relay 36 finally deenergizes the circuit to relay 63 is completed at armature 64, whereupon the said relay energizes and regrounds release trunk conductor 20. The interval between the deenergization of relay 19 and the deenergization of relay 36 is sufficient to allow the release of the preceding switches.

If the calling subscriber should restore his receiver before the number he called is completely registered the release of the repeater and the associated line switch takes place in the usual manner. The deenergization of relay 19 of the repeater D will remove ground from the release trunk conductor 42, whereupon relay 115 of the coder relay group CR will deenergize and cause the release of the master digit register M and of the digit registers $M^1$ to $M^4$, inclusive, as previously explained. At this time no circuit changes have been brought about at the trunk relay group $D^2$, and no release is necessary.

If the calling subscriber should restore his receiver before the number he called is completely decoded, relays 17, 19 and 36 of the repeater D will deenergize and bring about the release of the preceding switches in the usual manner. The relay 27 of the line switch $C^3$ will not deenergize at this time. Neither will the master digit register M and the digit registers $M^1$ to $M^4$, inclusive, release, for relay 137 of the coder relay group has regrounded release trunk conductor 42 by way of armatures 163 and 158. When relay 36 deenergizes, shortly after its circuit is opened by relay 19, a circuit is closed from grounded release trunk 42, test contact 34, wiper 31 armature 32 and its working contact, working contact and armature 33, armature 53 and its resting contact, armature 35 and its resting contact, through the upper winding of relay 63 to battery. Relay 63 will operate to reground the release trunk 20 in the usual way.

As previously explained, the relay 137 will deenergize when the complete code has been sent, the release of the coder and the coder selecting line switch taking place in the usual manner. Relay 55 of the repeater will not be operated at this time because of the open circuit at armature 38 of line relay 17. It is evident that the removal of ground from release trunk conductor 42 will cause the deenergization of the upper winding of relay 63. Relay 63 would remove ground from the release trunk 20 at this time were it not for a circuit completed at the trunk relay group $D^2$. When the decoding is complete the decoder $D^3$ will transfer the number to the storage relay group $D^4$, where it will appear upon the call indicator lamps L.

As previously explained the transferring of the number to the storage relay group $D^4$ will cause the operation of relay 432 of the trunk relay group $D^2$. Relay 432, upon energizing, will remove ground from the associated test contact in the banks of the trunk finder and will at the same time place battery through resistance 452 upon trunk conductor 51 by way of armature 411. The lower winding of relay 63 of the repeater D will now energize over the previously traced circuit and will maintain ground upon the release trunk conductor 20.

For the purpose of explanation it will be assumed that the operator completes the connection to the desired line by means of the cord circuit O. When the plug is inserted in the multiple jack the associated trunk finder $C^4$ will operate to find the trunk relay group $D^2$ in the usual manner. When the relay 450 energizes the storage relay group $D^4$ and the call indicator lamps will be released as before explained. The energization of relay 450 also removes the resistance 452 from trunk conductor 51. Relay 63 of the repeater D will now deenergize and free the trunk. As there is no circuit for the line relay 624 of the cord circuit O the said relay will remain at normal and the disconnect lamp 617 will immediately light. The ring will not start, and the operator will immediately take down the connection.

If the calling subscriber should dial the second digit of the number 32490 before the coder selecting line switch had selected an idle coder, it is obvious that serious difficulties would occur. In order to guard against this possibility the circuits have been so arranged that the calling subscriber will receive the busy tone should he dial the next digit before relay 36 of the repeater D has energized. If the line relay 17 deenergizes before relay 36 energizes, a circuit may be traced from ground, working contact and armature 22, resting contact and armature 38, armature 39 and its resting contact, through relay 32 to battery. Relay 32, upon energizing, forms a locking circuit for itself, independent of the further operation of relay 17, which may be traced from ground, working contact and armature 22, armature 24 and its working contact, resistance 66, through relay 32 to battery. A further result of the energization of relay 32 is the placing of a busy tone from the busy tone machine $B^{24}$ upon trunk conductor 13 by way of armatures 67 and 56. A still further result of the operation of relay 32 is the opening of the circuit to the line relay 26 of the coder selecting line switch. The dialing of the remaining digits will be without effect, and the release will take place in the usual manner when the calling subscriber replaces his receiver.

Having described my invention, what I consider to be new and desire to have protected by Letters Patent will be pointed out in the appended claims.

What I claim is:

1. In a telephone system, trunk lines extending from an automatic exchange to a manual exchange for handling automatic to manual calls, registering equipment controlled by a calling automatic subscriber for registering the number of the wanted manual subscriber when a trunk is taken for use, means for displaying the registered number to an operator, a plurality of plug ending cords common to said trunks, and automatic switching mechanism responsive to the insertion of any plug in the jack of the wanted subscriber for connecting the associated cord with the trunk in use by the calling subscriber.

2. In a manual telephone office, trunk lines incoming from an automatic office, a plurality of plug ending cord circuits common to said trunk lines, means operative when a call is received over one of said trunk lines for displaying the called number to an operator, and automatic switching mechanism responsive to the insertion of any plug in the jack of the called line for connecting the associated cord with the trunk line in use.

3. In a manual telephone office, trunk lines incoming from an automatic office, a plurality of plug ending cord circuits, a finder for each cord circuit, all said finders having access in common to said trunk lines, means operative when a call is received over one of said trunk lines for displaying the called number to an operator, and means responsive to the insertion of any plug in the jack of the called line for causing the finder of the associated cord circuit to hunt for and connect with the trunk line in use.

4. In a manual telephone office, trunk lines incoming from an automatic office, a plurality of plug ending cord circuits common to said trunk lines, means operative when a call is received over one of said trunk lines for displaying the called number to an operator, automatic switching mechanism responsive to the insertion of any plug in the jack of the called line for connecting the associated cord with the trunk line in use, and means for releasing said switching mechanism when the calling subscriber hangs up his receiver, whereby the trunk line is made available for other calls while the plug remains in the jack.

5. In a manual telephone office, trunk lines incoming from an automatic office, a plurality of plug ending cord circuits, a finder for each cord circuit, all said finders having access in common to said trunk lines, means operative when a call is received over one of said trunk lines for displaying the called number to an operator, means responsive to the insertion of any plug in the jack of the called line for causing the finder of the associated cord circuit to hunt for and connect with the trunk line in use, and means for breaking the connection at the operated finder when the calling subscriber hangs up his receiver, whereby the trunk line is made available for other calls whether the operator withdraws the plug or not.

6. In a manual telephone office, trunk lines incoming from an automatic office, a plurality of plug ending cord circuits, a finder for each cord circuit, all said finders having access in common to said trunk lines, means operative when a call is received over one of said trunk lines for displaying the called number to an operator, means responsive to the insertion of any plug in the jack of the called line for causing the finder of the associated cord circuit to hunt for and connect with the trunk line in use, means for breaking the connection at the operated finder when the calling subscriber hangs up his receiver, whereby the trunk line is made available for other calls whether the operator withdraws the plug or not, and means for again closing the connection responsive to the changing of the plug to the jack of the second called line in case another call is received over said trunk line.

7. In a manual telephone office, trunk lines incoming from an automatic office, a plurality of plug ending cord circuits, a finder for each cord circuit, all said finders having access in common to said trunk lines, means operative when a call is received over one of said trunk lines for displaying the called number to an operator, means responsive to the insertion of any plug in the jack of the called line for causing the finder of the associated cord circuit to hunt for and connect with the trunk line in use, and means for releasing the operated finder when the calling subscriber hangs up his receiver, whereby in case the operator changes the plug to another called line the said finder may be started hunting for the trunk over which the second call is coming in.

8. In a manual telephone office, trunk lines incoming from an automatic office, means operative when a call is received over one of said trunk lines for displaying the called number to an operator, a plug ending cord circuit common to said trunk lines for testing the called line and for completing the connection if the line is idle, and means in the trunk circuit in use for giving the busy signal to the calling subscriber in case the called line is busy, thus enabling said cord circuit to be used for a call on another trunk while the first calling subscriber is listening to the busy signal.

9. In a manual telephone office, trunk lines incoming from an automatic office, means operative when a call is received over one of said trunk lines for displaying the called number to an operator, a plug ending cord circuit common to said trunk lines for testing the called line and for completing the connection if the line is idle, a relay in each trunk for placing a busy tone on the calling line, a key common to said trunk circuits actuated by the operator in case the called line is busy, and circuits controlled by said key for operating the said relay in the trunk in use, thus giving the calling subscriber a busy signal without retaining the use of said cord circuit.

10. In a telephone system, trunk lines extending from an automatic exchange to a manual exchange, a coder at the automatic exchange, automatic switching mechanism responsive to an automatic to manual call for connecting said coder to the trunk line in use, register switches in said coder for registering the digits in the called number, sending mechanism in said coder for transmitting the digits over the trunk line to the manual office in code, means at the manual office for controlling said coder over the trunk line to start the transmitting operation, means for releasing the coder at once in case the calling party hangs up before the transmitting operation has started, and means for preventing the release of the coder until the transmitting operation has been completed in case the calling party hangs up after such operation has started.

11. In a telephone system, trunk lines extending from an automatic exchange to a manual exchange, a coder at the automatic exchange, automatic switching mechanism responsive to an automatic to manual call for connecting said coder to the trunk line in use, register switches in said coder for registering the digits in the called number, sending mechanism in said coder for transmitting the digits over the trunk line to the manual office in code, means at the manual office for controlling said coder over the trunk line to start the transmitting operation, means for releasing said switching mechanism and for restoring the coder to common use in case the calling party hangs up before the transmitting operation has started, and means for preventing the restoration of said coder and for maintaining the same in busy condition until the transmitting operation is completed in case the calling party hangs up after such operation has started.

12. In a telephone system, trunk lines extending from an automatic exchange to a manual exchange, coders at the automatic exchange, an automatic switch responsive to an automatic to manual call for connecting an idle coder to the trunk line in use, means in said coder for registering the digits in the called number, sending mechanism in said coder for transmitting the digits over the trunk line to the manual office in code, a decoder at the manual office connected to the trunk line to receive the number, a display device, means for transferring the decoded number to said display device, and means for automatically switching the decoder to another trunk line at which a second call has arrived in order that the number of the second called party may be received and decoded while the operator is completing the connection corresponding to the displayed number.

13. In a manual telephone office, a plurality of trunk lines incoming from an automatic office, means for transmitting telephone numbers over said trunk lines in code, for decoding the numbers as received, and for displaying the decoded numbers to an operator, a plurality of markers, means including a marker distributer for causing a preselected marker to hunt for and connect with a trunk line when a number is to be transmitted thereover, and a set-up control switch for testing said markers in regular order, thereby starting the transmission of numbers over those trunk lines which have markers associated with them in regular rotation.

14. In a manual telephone office, trunk lines incoming from an automatic office, a coder in the automatic office for transmitting telephone numbers over said trunk lines in code, a decoder in the manual office, a plurality of markers, means controlled over the trunk line in use when a number is ready to be transmitted for causing a selected marker to hunt for and connect with the trunk line, a marker distributer for preselecting another marker for the next call, and a set-up control switch for causing the decoder to associate itself with the trunk line to receive and decode the number when transmitted.

15. In a manual telephone office, trunk lines incoming from an automatic office, a coder in the automatic office for transmitting telephone numbers over said trunk lines in code, a decoder in the manual office, a plurality of markers, means controlled over the trunk line in use when a number is ready to be transmitted for causing a selected marker to hunt for and connect with the trunk line, a marker distributer for preselecting another marker for the next call, a set-up control switch operated to connect with the marker in use for the first call, and circuits controlled by said control switch for connecting the decoder with the trunk line and for starting the transmission of the code.

16. In a telephone system, the combination with a two conductor trunk line, of means for transmitting digits over said trunk line in code, said means comprising a device for sending impulses over one conductor of said trunk line while maintaining a variable electrical potential on the other conductor.

17. In a telephone system, the combination with a two conductor trunk line, of means for transmitting digits over said trunk line in code, said means comprising a device for sending series of impulses over one conductor of said trunk line, the maximum number of impulses being a multiple of the largest digit, and means for maintaining any one of a plurality of different electrical potentials on the other conductor while the impulses for each digit are being transmitted.

18. In a manual telephone office, trunk lines incoming from an automatic office, a cord circuit for connecting a trunk line over which a call has been received with the called line, a supervisory lamp in said cord circuit, means responsive to the replacement of the receiver by the calling party for lighting said lamp and for maintaining the lamp lighted after the called man hangs up, and means for causing said lamp to flash if the called party removes his receiver before the operator pulls down the connection.

19. In a manual telephone office, trunk lines incoming from an automatic office, a cord circuit for connecting a trunk line over which a call has been received with the called line, a supervisory lamp in said cord circuit, means responsive to the replacement of the receiver by the calling party for lighting said lamp and for maintaining the lamp lighted after the called man hangs up, means for causing said lamp to flash if the called party removes his receiver before the operator pulls down the connection, and means for causing an audible signal to be given the operator while said lamp is flashing.

20. In a manual telephone office, trunk lines incoming from an automatic office, a cord circuit for connecting a trunk line over which a call has been received with the called line, a supervisory lamp in said cord circuit, means responsive to the replacement of the receiver by the calling party for lighting said lamp and for maintaining the lamp lighted after the called man hangs up, means for causing said lamp to flash if the called party removes his receiver before the operator pulls down the connection, and means for giving the operator an audible signal while said flashing means is operating so that in case the lamp is defective the called party can attract the attention of the operator.

21. In a telephone system, a group of trunk lines, means for connecting calling lines to said trunk lines, plug ending cord circuits common to said trunk lines for extending the same to called lines, finder switches individual to said cord circuits for connecting them to said trunk circuits, and means for starting said finder switches at the will of the operator at whose position said cord circuits are located.

22. In a telephone system, a group of trunk lines, means for connecting calling lines to said trunk lines, plug ending cord circuits common to said trunk lines for extending the same to called lines, finder switches individual to said cord circuits for connecting them to said trunk circuits, and means for starting any finder switch responsive to the insertion of the plug of the associated cord circuit in the jack of a called line.

23. In a telephone system, a group of trunk lines, means for connecting a calling line to an idle one of said trunk lines, a plug ending cord circuit common to said trunk lines, and an automatic hunting switch for selecting the trunk line in use and connecting the same to said cord circuit when the plug thereof is inserted in the jack of a called line.

24. In a telephone system, a group of trunk lines, means for connecting a calling line to an idle one of said trunk lines, a plug ending cord circuit common to said trunk lines, an automatic hunting switch for selecting the trunk line in use and connecting the same to said cord circuit when the plug thereof is inserted in the jack of a called line, whereby the calling and called lines are connected, and means for releasing said switch, responsive to the replacement of the receiver on the calling line.

25. In a telephone system, a group of trunk lines, means for connecting a calling line to an idle one of said trunk lines, a plug ending cord circuit common to said trunk lines, automatic switching mechanism for connecting the trunk line in use to said cord circuit responsive to the insertion of the plug thereof in the jack of a called line, and means under the control of the calling subscriber for releasing said switching mechanism.

26. In a telephone system, a group of trunk lines, means for connecting a calling line to an idle one of said trunk lines, a plug ending cord circuit common to said trunk lines, automatic switching mechanism responsive to the insertion of the plug in a called line for selecting the trunk line in use, and test circuits for preventing said mechanism from connecting the cord circuit to any busy but unconnected trunk line except the one which is in use by the calling party.

27. In a telephone system, trunk lines, means for connecting calling lines to said trunk lines, means for successively displaying the numbers of the called lines to an operator, cord circuits for use by the operator in establishing connections with such called lines, finder switches associated with said cord circuits, and means for rendering busy trunk lines accessible to said finders one at a time and in the same order as the order in which the numbers of the called lines are displayed.

28. In a telephone system, a group of trunk lines, means for connecting calling lines to said trunk lines at one end, finder switches having access to said trunk lines at the other end, and an automatic consecution controller for rendering simultaneously busy trunk lines selectable by said finders one at a time.

29. In a telephone system, trunk lines extending from an automatic exchange to a manual exchange, register senders at the automatic office, means for connecting said senders to busy trunk lines when they are taken for use to register the called manual numbers and transmit such numbers to the manual office in code, and means at the manual office for automatically sorting the busy trunk lines and for starting the operation of the register senders associated therewith in the same order as the order in which the registration of the numbers thereon is completed.

30. In a telephone system, a group of trunk lines, a smaller group of marker switches, a control circuit individual to each trunk line multipled in the banks of said switches, a common control circuit associated with each marker switch, means responsive when trunk lines are in use for causing said markers to connect said common control circuits to the individual control circuits of the busy trunk lines, and a device for testing said markers in regular order to render the connected common control circuits active in succession.

31. The combination, with a group of trunk lines taken into use in indiscriminate order, of means for sorting busy trunk lines with respect to the time at which any particular circuit change takes place therein, said means comprising marker switches one of which is operated to connect to each busy trunk line on the occurrence therein of the specified circuit change, and a control switch having access to the marker switches in a regular order of rotation.

32. In a code transmitter, two outgoing control conductors, a switching device for establishing any one of a plurality of distinctive circuit conditions in one of said conductors, said device also including means for sending a variable series of impulses over the other conductor while the selected circuit condition is maintained on the first conductor, and a register for controlling said switching device.

33. A decoder comprising a series of counting relays, impulse circuits equal in number to said relays, each circuit being normally connected with a different relay, relays for selecting any one of said circuits, and an impulse responding relay for repeating impulses to all said counting relays over any selected circuit.

34. A decoder comprising a series of counting relays, an impulse responding relay for repeating impulses to said relays in succession, and control relays for determining which of said counting relays receives the first impulse of a series of impulses which operate all of said relays.

35. A decoder comprising a series of counting relays, means for energizing said relays in turn, and means for starting the energizing operation at any one of a plurality of points in the series.

36. The method of transmitting a digit over a trunk line in code which consists in maintaining any one of a plurality of distinctive circuit conditions in one trunk conductor while impulses which may or may not differ in number from the denomination of the digit to be transmitted are sent over the other trunk conductor.

37. The method of transmitting digits over a trunk line in code which consists in maintaining any one of a plurality of distinctive circuit conditions in one trunk conductor while non-digit impulses are sent over the other conductor and in then establishing a momentary circuit condition in said first trunk conductor which is the same as one of said distinctive conditions in order to terminate the instant digit and prepare for the next.

38. In a telephone system, a cord circuit for connecting a calling and a called line, a disconnect signal lamp lighted when the calling subscriber hangs up, means for flashing said lamp if the called party replaces and removes his receiver before the connection is pulled down, and a circuit for simultaneously giving the operator an audible signal in her receiver.

39. In a telephone system, a cord circuit for connecting a calling and a called line, and means responsive only in case both subscribers hang up and one of them again removes his receiver before the connection is pulled down for giving the operator an audible signal in her receiver.

40. In a telephone system, a cord circuit for connecting a calling and a called line, a circuit for audibly signalling the operator in her receiver, means for preparing said circuit responsive to the joint hanging up of the receivers at both stations, and means for completing said circuit responsive to the subsequent removal of the receiver at one of said stations while the connection remains up.

41. In a register sender, a plurality of registers, each having a restoring magnet, a relay for holding the circuits of said magnet open, a holding conductor and an impulsing conductor incoming to said register sender, an initial energizing circuit for said relay including said impulsing conductor, and a locking circuit for said relay including said holding conductor.

42. In a telephone system, a cord circuit for connecting a calling line and a called line, a signal lamp lighted responsive to the calling subscriber hanging up his receiver, and a flashing circuit for said lamp closed only in case the calling subscriber has replaced his receiver and the called subscribed has replaced and removed his receiver.

43. In a telephone system, a link circuit for connecting a calling line and a called line, a signal circuit associated with said link circuit closed only in case the calling subscriber has replaced his receiver and the called subscriber has replaced and removed his receiver, and means in said circuit for transmitting an audible tone to an operator.

44. In a telephone system, means for establishing a talking connection between two telephone lines, a signal circuit, means for closing said signal circuit only in case both subscribers have replaced their receivers and one subscriber has again removed his receiver before the connection has been completely broken down and means in said circuit for transmitting an audible tone to an operator.

45. In a telephone system, means including a link circuit for setting up a connection between two telephone lines, a signal circuit including a conductor individual to said link circuit, and means controlled solely over one line for closing said signal circuit only in case the subscriber on the other line has replaced and removed his receiver.

46. In a code transmitter, an outgoing impulse conductor and an outgoing switching conductor, a sending device for transmitting digits over said conductors, the transmission of a single digit consisting of the transmission of the variable number of impulses over said impulse conductor and in the transmission of a single switching impulse over said switching conductor, and means in said sending device whereby the switching impulse is always terminated after the variable number of impulses has been transmitted over said impulse wire and whereby the switching impulse may be started either before the series of impulses has started or after it has ceased, depending upon the digit represented by the particular series of impulses transmitted.

47. In a code transmitter, an outgoing impulse conductor and an outgoing switching conductor, a sending device for transmitting digits over said conductors, the transmission of a single digit consisting of the transmission of the variable number of impulses over said impulse conductor and in the transmission of a single switching impulse over said switching conductor, and means for varying the length of the switching impulse in accordance with the digit represented by the series of impulses transmitted over said impulse conductor.

48. A decoder comprising a series of counting relays arranged in an endless chain, means for transmitting impulses to said relays for operating a variable number of them in succession, and means for determining which relay of said series shall receive the first impulse.

49. A decoder comprising a series of counting relays arranged in an endless chain, means for operating a variable number of said relays in turn, and means for starting the operation at any one of a plurality of points in the series.

50. A decoder comprising a series of relays arranged in an endless chain, an impulse responding relay for repeating impulses to said series of relays, means associated with said relays for causing them to respond successively to said impulses, a plurality of circuit paths over which the impulses are delivered to said series from said impulse responding relay, and means independent of said impulse responding relay for selecting any one of said circuit paths.

51. A relay register for registering a digit comprising a series of successively operable counting relays, means for operating said relays to register a variable series of impulses, means for starting the operation at any one of a plurality of points in the series, and means controlled by said relays for determining the digit registered in accordance with the number of counting relays operated in conjunction with the point in the series at which the operation is started.

52. A relay register for registering a digit comprising a series of successively operable counting relays arranged in an endless chain, means for operating said relays to register a variable series of impulses, means for starting the operation at any one of a plurality of points in the chain, and means controlled by said relays for determining the digit registered in accordance with the number of counting relays operated in conjunction with the point in the chain at which the operation started.

53. In a telephone system, trunk lines extending from an automatic exchange to a manual exchange, means in the automatic exchange associated with said trunk lines for storing manual telephone numbers, receiving and displaying apparatus in the manual office, and a sending device associated with said storage devices in the automatic office, responsive to control from the manual office, independent of any special act performed by the operator, for transmitting a stored number over one of said manual to automatic trunk lines to operate said receiving and display apparatus to display such number to the operator.

54. In a telephone system, trunk lines extending from an automatic exchange to a manual exchange, means in the automatic exchange for storing and for subsequently transmitting over one of said trunk lines manual telephone numbers, a single receiving device in the automatic office, means reponsive to control over one of said trunk lines when a number has been stored in the automatic office for associating said receiving device with such trunk line, means controlled by said associating operation for initiating the operation of the transmitting means to transmit the stored number over the trunk line in use, and means controlled jointly by the arrival of a subsequent call on another trunk line and by an act of the operator in the routine operation of setting up connections for shifting said receiving device to the latter trunk line.

55. In a telephone system, trunk lines incoming to a manual office from an automatic office, a call indicator in said manual office, a registering device controlled over any one of said trunk lines for setting up a number on said call indicator, means for switching said registering device to another trunk line, and means for maintaining said number set up on said call indicator after said device has been switched to another trunk line.

56. In a telephone system, trunk lines incoming to a manual office from an automatic office, a call indicator in said manual office, a registering device controlled over any one of said trunk lines for setting up a number on said call indicator, means for maintaining said number set up on said call indicator and for switching said registering device to another trunk line, and means responsive to the disposal of the connection indicated by the number displayed on said indicator for wiping out the first display and for displaying the number registered over the newly connected trunk line.

57. In a telephone system, trunk lines incoming to a manual office from an automatic office, a call indicator in said manual office, a registering device controlled over any one of said trunk lines for setting up a number on said call indicator, means for maintaining said number set up on said call indicator and for switching said registering device to another trunk line, means responsive to the disposal of the connection indicated by the number displayed on said indicator for wiping out the first display and for displaying the number registered over the newly connected trunk line and for continuing the said receiving and display operation, as stated, as long as the calls continue to arrive.

58. In a telephone system, trunk lines incoming to a manual office from another office, a plurality of cord circuits, each cord circuit being common to said trunk lines, means for transmitting telephone numbers to an operator in said manual office from said other office, and means responsive to the act performed by the operator to complete the connection indicated by a received number for connecting the cord circuit in use by the operator with one of said trunk lines.

59. In a telephone system, trunk lines incoming to a manual office from another office, a plurality of cord circuits, each cord circuit being common to said trunk lines, means for transmitting telephone numbers to an operator in said manual office from said other office, and means responsive to the act performed by the operator to complete the connection indicated by a received number for connecting the cord circuit in use by the operator with a predetermined one of said incoming trunk lines.

60. In a telephone system, trunk lines incoming to a manual office from another office, a plurality of cord circuits, means for transmitting telephone numbers over said trunk lines to an operator in said manual office from said other office, and means responsive to the act performed by the operator to complete the connection indicated by a received number for connecting the cord circuit in use by the operator with the one of said incoming trunk lines over which the number was received.

61. In a telephone system, telephone lines incoming to a manual office from a first office, means in said first office for setting up a plurality of uncompleted connections to certain of said trunk lines, means in said manual office for placing said trunk lines into a connectible condition one at a time and for indicating to the manual operator the destination of the call on the instant connectible trunk line, cord circuits common to said trunk lines, and means responsive to the completion through one of said cord circuits of the operator's portion of the connection for connecting the cord circuit in use with the connectible trunk line.

62. In a telephone system, a cord circuit at a manual switchboard terminating in a plug at one end and in a trunk hunting switch at the other end, trunk lines accessible to said switch, means responsive to the placing of the plug of said cord circuit into the jack of a telephone line for operating said switch to connect the associated cord circuit with one of said trunk lines, means, including the last named trunk line for completing a connection between said telephone line and another telephone line, means controlled by the party on the last named telephone line when he replaces his receiver for releasing said switch while said plug is in said jack, and means responsive to the removal of said plug from said jack and to its subsequent reinsertion into a jack for again operating said switch to seize a trunk line.

63. A decoder comprising a series of counting relays, an impulse responding relay for repeating impulses to said relays in succession, and control relays for changing the order in which said counting relays receive successive impulses.

64. In a telephone office, trunk lines incoming from another office, means operative when a call is received over one of said trunk lines for signalling the operator, means for testing the called line and for completing the connection if the called line is idle, a key common to all said trunk lines momentarily operated by the operator in case a called line is busy, and means individual to the trunk line in use and responsive to the operation of said key for causing the busy signal to be transmitted to the calling subscriber desiring the connection with the busy line.

65. In a telephone office, trunk lines incoming from another office, means operative when a call is received over any one of said trunk lines for signalling the operator, a plurality of cord circuits any one of which may be used for testing the called line and for completing the connection if the called line is idle, a key common to all said trunk lines momentarily operated by the operator in case the called line is busy, and means individual to the trunk line in use and responsive to the operation of said key for causing the busy signal to be transmitted to the calling subscriber desiring the connection with the busy line.

66. In a manual telephone office, trunk lines incoming from an automatic office, means responsive to a call over any one of said trunk lines for signalling the operator, means common to said trunk lines for testing the called line and for completing the connection if the called line is idle, a key common to a plurality of said testing and connecting means, and means responsive to a momentary operation of said key for causing the busy signal to be continuously transmitted to the calling subscribed until the calling subscriber hangs up.

67. In a call distributing system, trunk circuits, cord circuits common to said trunk circuits, means responsive to a call for connecting the calling line to an idle trunk circuit at one end thereof, and means responsive to an act of the operator in extending the call to the called party for connecting the cord circuit in use to the connected trunk circuit at the other end thereof.

68. In a call distributing system, trunk circuits, automatic switches for extending calling lines to said trunk circuits, means including cord circuits common to said trunk circuit for testing called lines and for extending the trunk circuits thereto, an operator's key, and busy signalling means in each trunk circuit controlled by said key over paths excluding cord circuits.

69. In a call distributing system, trunk circuits, automatic switches for extending calling lines to said trunk circuit, means including cord circuits common to said trunk circuits for testing called lines and for extending the trunk circuits thereto, a relay in each trunk circuit for giving a calling subscriber connected thereto a busy signal, and circuits independent of said cord circuits over which the operator can cause the actuation of the busy relay in any trunk circuit.

70. In a telephone system, a telephone exchange, telephone lines terminating at said exchange, a plurality of cord circuits, at said exchange, means including one of said cord circuits for interconnecting one of said telephone lines as a calling line and another of said telephone lines as a called line, means for characterizing said telephone lines as busy or idle, a source of busy tone, and means including a busy-back key common to said cord circuits for transmitting a busy tone to a calling telephone line when the called telephone line is busy.

71. In a telephone system, a telephone switchboard, telephone lines terminating at said switchboard, a plurality of cord circuits at each switchboard, any one of which cord circuits may be used for interconnecting one of said telephone lines as a calling line and another of said telephone lines as a called line, means for characterizing any telephone line as busy or idle, a source of busy tone, and means including a busy-back key common to said cord circuits for controlling the transmission of a busy tone to said calling telephone line when said called telephone line is busy.

72. In a telephone system, a telephone exchange, lines terminating at said exchange, a plurality of cord circuits, at said exchange, means including one of said cord circuits for interconnecting one of said lines as a calling line and another of said lines as a called line, means for characterizing said lines as busy or idle, a source of busy tone, and means including a busy-back key common to said cord circuits for transmitting a busy tone to a calling line when the called line is busy.

73. In a telephone system, a telephone switchboard, lines terminating at said switchboard, a plurality of cord circuits at each switchboard, any one of which cord circuits may be used for interconnecting one of said lines as a calling line and another of said lines as a called line, means for characterizing any line as busy or idle, a source of busy tone, and means including a busy-back key common to said cord circuits for controlling the transmission of a busy tone to said calling line when said called line is busy.

74. In a telephone system, an operator's position, a plurality of cord circuits at the position for connecting calling and called lines, means associated with the cord circuits for determining the idle or busy condition of a called line, and a common manually operable key for controlling the application of a busy signal to a calling line connected to any one of said cord circuits.

In witness whereof I hereunto subscribe my name this 24th day of November, 1931.

JOHN E. OSTLINE.